(12) United States Patent
Kent et al.

(10) Patent No.: US 9,378,557 B2
(45) Date of Patent: Jun. 28, 2016

(54) MICROFLUIDIC DEVICE FOR ASSESSING OBJECT/TEST MATERIAL INTERACTIONS

(75) Inventors: Nigel Kent, Wexford (IE); Bryan Lincoln, Cumberland, RI (US); Lourdes Basabe-Desmonts, Dublin (IE); Antonio Ricco, Los Gatos, CA (US); Dermot Kenny, Dublin (IE); Gerardene Meade, Rush (IE); Brian Corcoran, Dundrum (IE)

(73) Assignees: Dublin City University, Dublin (IE); Royal College of Surgeons in Ireland, Dublin (IE)

( * ) Notice: Subject to any disclaimer, the term of this patent is extended or adjusted under 35 U.S.C. 154(b) by 1020 days.

(21) Appl. No.: 12/866,351

(22) PCT Filed: Feb. 5, 2009

(86) PCT No.: PCT/EP2009/051346
§ 371 (c)(1),
(2), (4) Date: Nov. 8, 2010

(87) PCT Pub. No.: WO2009/098272
PCT Pub. Date: Aug. 13, 2009

(65) Prior Publication Data
US 2011/0045993 A1 Feb. 24, 2011

(30) Foreign Application Priority Data
Feb. 5, 2008 (GB) .................................. 0802084.4

(51) Int. Cl.
*B01L 3/00* (2006.01)
*G06T 7/20* (2006.01)

(52) U.S. Cl.
CPC ......... *G06T 7/2033* (2013.01); *B01L 3/502776* (2013.01); *B01L 3/502715* (2013.01);
(Continued)

(58) Field of Classification Search
CPC .................... B01L 3/502715; B01L 3/502776; B01L 2200/0636; B01L 2300/0636; B01L 2300/0816; B01L 2300/0867; B01L 2300/0877; B01L 2300/163; B01L 2400/084
See application file for complete search history.

(56) References Cited

U.S. PATENT DOCUMENTS 6,473,698 B1 10/2002 Albert et al.
2005/0106066 A1 5/2005 Saltsman et al.
(Continued)

FOREIGN PATENT DOCUMENTS

DE   10 2005 003961 A1   8/2006
EP   1201304 A2   5/2002
(Continued)

OTHER PUBLICATIONS

Eckert, Lars, "International Search Report", for PCT/EP2009/051346 as mailed Oct. 2, 2009, 7 pages.
(Continued)

*Primary Examiner* — Jeremy C Flinders
(74) *Attorney, Agent, or Firm* — Winstead PC

(57) ABSTRACT

An object/test material interaction microti iridic device comprising a sample inlet adapted to receive a fluid sample comprising a plurality of objects, an outlet adapted to output the fluid sample from the device, at least one internal surface defining a flow cavity within the device, wherein the flow cavity extends between and is connected to the sample inlet and the outlet for flow of the fluid sample through the flow cavity, the flow cavity comprises a test area to which at least one test material is attached and which is situated in the flow cavity for flow of the fluid sample over the test area, and the flow cavity has an aspect ratio which, when the flow cavity is substantially filled by the fluid sample, provides a substantially constant shear force between the test area and the fluid sample flowing over the test area. The invention further comprises a system incorporating the device, methods of use of the device and system, and methods of analyzing interactions.

5 Claims, 16 Drawing Sheets

(52) U.S. Cl.
CPC .. *B01L2200/0636* (2013.01); *B01L 2300/0636* (2013.01); *B01L 2300/0816* (2013.01); *B01L 2300/0867* (2013.01); *B01L 2300/0877* (2013.01); *B01L 2300/163* (2013.01); *B01L 2400/084* (2013.01); *G06T 2207/10016* (2013.01); *G06T 2207/10056* (2013.01); *G06T 2207/30024* (2013.01); *G06T 2207/30241* (2013.01)

(56) References Cited

U.S. PATENT DOCUMENTS

| 2006/0127275 | A1 | 6/2006 | Holl et al. | |
|---|---|---|---|---|
| 2006/0134800 | A1 | 6/2006 | Malmqvist et al. | |
| 2007/0036678 | A1* | 2/2007 | Sundararajan et al. | 422/68.1 |

FOREIGN PATENT DOCUMENTS

| WO | WO-2006/119806 | A1 | 11/2006 |
|---|---|---|---|
| WO | WO-2007/024701 | A2 | 3/2007 |
| WO | WO-2007089777 | A2 | 8/2007 |

OTHER PUBLICATIONS

Foster, J., et al., "An angle independent pattern recognition algorithm for ultrasound image blood flow estimation", System Theory, 1990, Twenty-Second Southeastern Symposium on Cookeville, TN, USA Mar. 11-13, 1990, Los Alamitos, CA, USA, IEEE Comput. Soc, US, pp. 2-6.

Kent, J.C., et al., "Dynamic photogrammetry utilizing high-speed digital imaging", Proceedings of the 22nd International Congress on High-Speed Photography and Photonics, SPIE, [Online] vol. 2869, 1997, pp. 794-797.

* cited by examiner

MICROFLUIDIC DEVICE FOR ASSESSING OBJECT/TEST MATERIAL INTERACTIONS

FIELD OF THE INVENTION

The present invention relates to a microfluidic device for assessing object/test material interactions, in particular, hydrodynamic shear force mediated interactions between cellular species and a test material. The invention further relates to a system incorporating the device, methods of use of the device and system, and methods of analysing interactions.

BACKGROUND TO THE INVENTION

Hydrodynamic-shear-force mediated interactions between cellular species and their physical environment are central in developmental biology, cancer progression, thrombus formation and other processes. The interactions of the cells with a well-defined surface matrix and with other, cells may be studied under conditions incorporating a bio-rheological environment, as a function of the degree of fluid shear, for example by exposing the cells to biological, chemical or physical shear agonists (or antagonists). Cell-surface and cell to cell interactions may provide an indication of the "activation state" of the cell of interest (essentially, its biochemical and physiological status). The activation state of blood platelets is of particular biomedical interest as the activation state can be an indicator of disease, injury or other physiological stress.

Cardiovascular disease is the leading cause of mortality in Europe and the USA. Cardiovascular events, such as heart attack or stroke, are caused by thrombosis, i.e. the formation of clots which occur as a result of platelet activation. The events initiating thrombosis after vessel injury or plaque rupture are now relatively well understood. At shear flow rates characteristic of arterial circulation, initial platelet adhesion involves Glycoprotein (GP) GPIb-IX-V binding to von Willebrand Factor (vWF), this leads to adherent platelets becoming activated, leading to granule release, functional activation of the platelet-specific integrin GPIIb-IIIa ($\alpha_{IIb}$-$\beta_3$) and platelet aggregate formation resulting in an arterial clot or thrombus. This thrombus provides a procoagulant surface leading to the localized generation of thrombin, and hence fibrin, which in part provides structural stability to the developing thrombus.

In contrast to arterial thrombosis, the classic triad described by Virchow in 1856 encapsulates the mechanism of venous thrombosis. This triad of local trauma to the vessel wall, hypercoagulability and stasis leads to venous thrombosis.

The paradigms of arterial and venous thrombosis described above are broadly held. However, while some of the acquired conditions that cause venous thrombosis are understood, there is a remarkable paucity of information on the interaction of platelets with the vessel wall in circulation where many fundamental questions remain to be addressed. For example, the emerging disciplines of genomics and proteomics have identified new proteins in platelets. The roles of these newly identified proteins in thrombosis are not yet understood.

Although thrombosis is prevented in part by aspirin and anti-platelet agents (plavixs and GPIIb IIIa antagonists), heart attacks and stroke still frequently occur. This suggests that the "stickiness" or level of activation of platelets in individuals differs, as does individual response to therapy. In particular, it is difficult to predict those individuals likely to suffer from cardiovascular disease or cardiovascular events.

Unfortunately, platelets are only suited to meaningful assay of their function for approximately four to six hours after being taken from the object. The process of preparing ex vivo platelets shortens this time span. In view of this limitation, typically, only a small number of tests can be performed using prepared platelets. In turn, such studies only provide a small amount of information on platelet function. This means it is yet unclear what constitutes normal platelet function.

The ability to characterise platelet function under haemodynamically relevant conditions would be of benefit, as it would yield valuable prognostic, diagnostic and therapeutic information. In particular, the ability to assess platelet function rapidly in the clinic or at the bedside and more particularly, without any biochemical preparation or alteration of the platelets following their removal from the object, would allow for a more accurate prediction of cardiovascular risk and for anti-platelet therapy to be tailored to the needs of an individual patient in order to minimise the risks of thrombosis and bleeding.

There are a small number of commercially available platelet function analysers on the market. However, these devices have some limitations.

The gold standard test for platelet function is Light Transmission Standard Aggregometry. Unfortunately, the Standard aggregometer test is limited in that the procedure takes a considerable amount of time to perform as the device generally only has a small number of channels (around four channels). Furthermore, aggregometry is not a measure solely or simply of platelet activation status, the aggregation process depending on a complex biochemical and physical sequence of which platelets are one key part.

The PFA (platelet function analyzer)-100™ device measures time to clotting after exposure of whole blood to collagen and epinephrine or collagen and ADP (known as the closure time). However, comparison of the results provided by a PFA-100™ device with those of the gold standard platelet function test, indicates differences and thus the PFA-100™ device has limited suitablility.

The Accumetrics Verify Now™ device can be used at the bedside using whole blood to assess platelet function. This device allows the assessment of response to aspirin or Clopidogrel. However, as for the PFA-100™ device, this device only provides a limited amount of information regarding platelet reactivity.

Diamed—Impact-R is a device for testing platelet function under close to physiological conditions. This device tests platelet adhesion and aggregation in anti-coagulated whole blood (for example, using citrate buffer inside blood-draw tubes) under arterial flow conditions ($1800\,s^{-1}$ for 2 min). The Impact-R can be used to study platelet function, screening of primary haemostasis abnormalities and monitoring therapies for treatment of such abnormalities. It can be used for testing both hypo- and hyper-function of platelets and provides a quick method for monitoring the response to various anti-platelet drugs.

Glycotech provides parallel plate flow chambers for research studies under haemodynamic conditions. The chambers currently provided are require assembly to form the complete chamber require the use of a vacuum pump to form a seal of the chamber components; a top plate (or flow deck), silicon rubber gaskets, the dimensions of which, form the flow path area and glass coverslips. For clinical haemodynamic studies, the assembly of the flow chambers and sample provision is technically laborious and requires training. In addition, the volume of blood sample required for haemodynamic studies is considerable. (Using the Glycotech rectangular parallel plate flow chamber, to achieve an arterial flow rate of 1,500 s-1 a blood flow rate of approx. 2.42 ml/min is required). Further, an independent imaging system and operator with expertise in imaging is required. Glycotech is not suitable for point of care use.

Platelet reactivity and the ability of platelets to become activated differs between individuals, and, furthermore, varies within the same individual at different time points. Assessing this variability using the currently available tests is difficult, time inefficient and expensive. Further, whilst a number of platelet function tests are available for clinical application, these tests are less than ideal for point-of-care use. Many of these tests do not account for the potential function of novel or poorly characterised platelet receptors, or use non-physiological agonists to stimulate platelet function and thus are of questionable physiological relevance. Further, they require repeated blood draws, which is not practicable, particularly in infants, as significant volumes of blood are required.

A diagnostic device that uses physiological stimuli on small volumes of blood would be advantageous to provide true point of care evaluation of platelet function for bleeding disorders, thrombotic risk and monitoring drug therapy.

SUMMARY OF THE INVENTION

According to a first aspect of the present invention there is provided an object/test material interaction microfluidic device comprising
- a sample inlet adapted to receive a fluid sample comprising a plurality of objects,
- an outlet adapted to output the fluid sample from the device,
- at least one internal surface defining a flow cavity within the device, wherein
- the flow cavity extends between and is connected to the sample inlet and the outlet for flow of the fluid sample through the flow cavity,
- the flow cavity comprises a test area to which at least one test material is attached and which is situated in the flow cavity for flow of the fluid sample over the test area, and
- the flow cavity has an aspect ratio which, when the flow cavity is substantially filled by the fluid sample, provides a substantially constant shear force between the test area and the fluid sample flowing over the test area.

Such a device enables the examination of the interaction between the objects and the test material of the test area under conditions where the shear force between the test area and the fluid sample flowing over the test area is substantially constant, and so more physiologically relevant results from such examination may be obtained.

In this invention, the aspect ratio of the flow cavity is defined as the ratio of the width to the height of the flow cavity (i.e. in a cross-section of the flow cavity, the ratio of a first dimension of the cross-section through a centre point of the cross section and perpendicular to a direction of flow of the fluid sample to a second dimension of the cross-section through the centre point of the cross-section and perpendicular to the first dimension). It has been found that the aspect ratio of the flow cavity directly influences the flow dynamics of any fluid sample flowing therethrough, i.e. influences the position, orientation and magnitude of the velocity of the fluid sample, and resulting imparted shear force between the fluid sample and the flow cavity. The inventors have identified that flow cavities having a cross-section with a short height relative to a wide width provide good control over the flow dynamics of a fluid sample flowing therethrough, such that a substantially constant shear force is achieved between the test area of the flow cavity and the fluid sample flowing over the test area.

The aspect ratio of the flow cavity may be in the range of approximately 15 to approximately 2000, for example in the range of 400 to 800.

The flow cavity may have a substantially rectangular cross-section. The flow cavity may be elongate, for example may comprise an elongate tube. The elongate flow cavity may have a length in the range of approximately 10 mm to approximately 45 mm.

In order to exploit the fluid dynamic determining properties of the dimensions of the flow cavity, the fluid sample substantially fills the flow cavity to its maximum capacity. This however causes problems when limited supplies of the fluid sample are available, or the fluid sample is prohibitively expensive. In order to address this problem, the inventors have determined that it is possible to operate the device on a relatively small scale, thereby enabling its operation using relatively small volumes of the fluid sample.

The height of the flow cavity may be less than or equal to 150 µm, less than or equal to 130 µm, less than or equal to 100 µm, or less than or equal to 50 µm.

The flow cavity may have a width in the range of approximately 500 µm to approximately 10 mm, and a height in the range of approximately 50 µm to approximately 300 µm; for example a width of approximately 2 mm and a height of approximately 50 µm, or a width of approximately 4 mm and a height of approximately 100 µm.

The flow cavity may maximally receive a volume of fluid sample in the range of approximately 1 µl to 30 µl.

The device may have a flow cavity maximum volume capacity of 3 µl, a flow rate of 75 µl/min and use a fluid sample volume of 200 µl over 3 mins.

In order to further reduce the amount of fluid sample required to operate the device, a fluid sample may be introduced to the device along with a fluid buffer. The term "buffer" is used to indicate a fluid that does not contain any of the objects, e.g. cells, that are the subject of assay or study of interactions with the test material on the test area. Typically, the fluid buffer's ionic strength and pH value can be defined and controlled at appropriate values by its chemical composition. The purpose of the fluid buffer is to ensure maximum capacity fill for the flow cavity (and so take advantage of the creation of a constant shear force between the test area of the flow cavity and the fluid sample flowing over the test area) without having to fill the flow cavity entirely with fluid sample. This could be achieved by introducing the fluid buffer along with the fluid sample in the same inlet, but results in a large degree of mixing of the fluid sample and fluid buffer prior to arriving in the flow cavity; which results in a dilution of the number of objects in flow.

Accordingly, the device may further comprise at least one buffer inlet adapted to receive a fluid buffer and connected to the flow cavity for flow of the fluid buffer through the flow cavity. For the avoidance of doubt, the buffer inlet is a distinct structure from the sample inlet. The flow cavity may then have an aspect ratio which, when the flow cavity is substantially filled by the fluid sample and the fluid buffer, provides a substantially constant shear force between the test area and the fluid sample flowing over the test area.

When using a fluid buffer, the device may have a flow cavity maximum volume capacity of 18 µl, a flow rate of 600 µl/min and use a fluid sample volume of 2 ml over 3 mins.

It should be understood that the test area may be relatively small, due to the fact that assessing of the interactions between objects and the test material of the test area may be achieved using a detector with a relatively small field of measurement. Consequently, although the flow of fluid buffer directed into the flow cavity by the buffer inlet helps to fill the flow cavity to capacity, it may also meet the flow of fluid sample and direct it away from the small test area.

The sample inlet may be connected to a first portion of the flow cavity which first portion comprises the test area, for flow of the fluid sample into the first portion and over the test area. The buffer inlet may be connected to a second portion of the flow cavity, for flow of the fluid buffer into the second portion.

Flow of the fluid buffer in the fluid cavity may shape flow of the fluid sample in the flow cavity to direct the fluid sample towards the test area of the flow cavity. Flow of the fluid buffer in the fluid cavity may be controlled to surround the fluid sample on one, two or three sides, which sides so not comprise a side of the fluid sample flowing over the test area.

The flow cavity may be defined by a first internal surface of the device comprising the test area, a second internal surface of the device opposite to and spaced apart from the first surface by edge internal surfaces of the device connected to and extending from the first surface towards the second surface.

The first portion of the flow cavity may be substantially bounded by the first surface and parts of the edge surfaces extending from the first surfaces. The second portion of the flow cavity may be substantially bounded by the second surface and parts of the edge surfaces extending from the second surface. The second portion may be further bounded by parts of the edge surfaces extending from the first surface.

The second portion of the flow cavity may be disposed relative to the first portion of the flow cavity such that flow of the fluid buffer in the second portion shapes flow of the fluid sample in the first portion to direct the fluid sample towards the first surface of the flow cavity. Such shaping of the fluid sample may cause the fluid sample to spread out over the first surface of the flow cavity.

In use, the device is preferable oriented such that the first internal surface of the flow cavity forms a base surface thereof, and the second internal surface of the flow cavity is above the base surface. The second portion of the flow cavity may be positioned above the first portion of the flow cavity such that flow of the fluid buffer in the second portion shapes flow of the fluid sample in the first portion by focusing the fluid sample towards the base surface of the flow cavity. This may further cause the fluid sample to spread out over the base surface.

Thus fluid buffer may be used with fluid sample in the device, thereby decreasing the volume of fluid sample required, whilst still effecting contact between the fluid sample and the test area.

It has been found that flow cavities with a low height and a wide width exhibit an "edge-effect", which means that the substantially constant shear force along a central portion of the first surface of the flow cavity differs from the shear force along the edge surfaces of the flow cavity.

The flow cavity may be bifurcated to comprise a main channel, a first branch and a second branch. The second portion of the flow cavity may be bounded by the second surface of the flow cavity and all of the edge surfaces of main channel and the branches. The buffer inlet may be connected to the branches, for flow of the fluid buffer into the second portion of the flow cavity, and along the second surface and edge surfaces thereof.

The fluid buffer will preferably surround the fluid sample on three sides. Suitably 1% to 90%, preferably 10% of the perimeter of the sample fluid is not surrounded by fluid buffer. This allows the fluid sample to contact the test material on the test area of the flow cavity. Suitably the width of the fluid sample in contact with the test material on the test area is approximately 2 µm to approximately 4 mm.

The test area may be provided on the first surface of the flow cavity away from the edge surfaces of the flow cavity.

When the first and second branches of the bifurcated flow cavity are both connected to a single buffer inlet, this negates the need for extra hardware required for an additional buffer inlet, such as connectors, tubing, pumps etc. used to provide two or more fluid buffer flows. It will be understood, however, that the device may comprise first and second buffer inlets connected to the first and second branches respectively.

The overall flow rate of fluid sample and fluid buffer through the device may be defined at the outlet by providing a negative pressure at the outlet.

The flow rate may be such as to provide a defined substantially constant shear force between the test area of the flow cavity and the fluid sample.

In embodiments of the device, fluid can be sucked through the device by withdrawing volume, for example, fluid from the outlet. As the volume per unit time leaving the device must be the same as the volume per unit time entering the device, the flow rate leaving the device is the sum of the entering flow rates of the fluid buffer and the fluid sample. As will be appreciated by those of skill in the art, when no fluid buffer is provided, the flow rate leaving the device will only depend on the entering flow rate of fluid sample into the device.

In such an embodiment of the device, for a negative pressure 'x' at the outlet,

Fluid buffer pressure=0. This implies the pressure on the sample inlet is 'x' and the fluid sample entirely fills the flow cavity.

Fluid buffer pressure is greater than zero, but less than negative pressure 'x'. This results in a certain amount of fluid buffer flowing through the device and the mismatch in pressure is compensated for by the fluid sample. Increasing this fluid buffer pressure reduces the amount of fluid sample required to compensate for the mismatch in pressures.

Fluid buffer pressure is greater than 'x'. Since the amount leaving the device is fixed at 'x' this results in the extraneous fluid buffer flowing out of the sample inlet.

The device may be prepared by lamination of a number of substrate layers, injection moulding, embossing, precision machining, etching, and various other microfabrication and fabrication methods.

The device may comprise first and second outer layers with one or more interposed layers between the first and second outer layers. Each layer may be substantially elongate. Each elongate layer may have a length which is greater than a width of the layer which is greater than a height (thickness) of the layer. Each elongate layer may comprise first and second elongate surfaces along the length and width of the layer.

The first outer layer may provide the sample inlet of the device. The sample inlet may comprise a sample inlet passage defined by the first outer layer and which passes through the first outer layer from a first elongate surface thereof to a second elongate surface thereof. The sample inlet may further comprise a sample inlet port, defined by an opening of the sample inlet passage in the first elongate surface of the first outer layer. The first outer layer may provide a buffer inlet of the device. The buffer inlet may comprise a buffer inlet passage defined by the first outer layer and which passes through the first outer layer from a first elongate surface thereof to a second elongate surface thereof. The buffer inlet may further comprise a buffer inlet port, defined by an opening of the buffer inlet passage in the first elongate surface of the first outer layer. Various devices may be attached to the sample inlet port and the buffer inlet port for introduction of fluid sample and fluid buffer into the sample inlet passage and the buffer inlet passage respectively. The first outer layer may provide the outlet of the device. The outlet may comprise an outlet passage defined by the first outer layer and which passes through the first outer layer from a first elongate surface thereof to a second elongate surface thereof. The outlet may further comprise an outlet port, defined by an opening of the outlet passage in the first elongate surface of the first outer layer. Various devices may be attached to the outlet port for removal of fluid sample and/or fluid buffer from the outlet passage and therefore from the device. The first outer layer may be formed from a material inert to the objects in the fluid sample, e.g. platelets in a blood or plasma sample. The first outer layer may be formed from, for example, a polymethacrylate material.

The second outer layer may provide the test area of the device. The second outer layer may comprise the test area on a first elongate surface of the layer. The test area has a test material attached thereto, for example, by coating the test material onto the test area. The second outer layer may be formed of polymer or glass. The polymer or glass may allow for suitable adhesion and uniform coating of a test material, for example matrix proteins, on the test area of the second outer layer. The second outer layer may be optically transparent to allow a signal produced following interaction between the objects and the test material to be detected by a detector. In embodiments of the device, the second outer layer may be optically transparent. The transparency may be over particular wavelengths. The polymer or glass may have a thickness less than 500 μm. The polymer or glass may have a thickness of approximately 100 μm.

The or each interposed layer may provide an aperture through the layer from a first elongate surface thereof to a second elongate surface thereof. The or each interposed layer may be a laser-patterned layers. The or each interposed layer may be laser-patterned to provide the aperture. The or each interposed layer may be a pressure-sensitive adhesive layers.

The first and second outer layers and the or each interposed layer may define the flow cavity of the device. The first elongate surface of the second outer layer may provide a first surface of the flow cavity, the second elongate surface of the first outer layer may provide a second surface of the flow cavity, and internal surfaces of the or each aperture of the or each interposed layer may provide edge surfaces of the flow cavity. The flow cavity may largely be sealed from the external environment.

The device may be assembled by pressing together the first and second outer, and or each interposed layer.

The device may comprise a plurality of flow cavities, in fluid connection with one or more sample inlets, one or more buffer inlets and one or more outlets. Where a plurality of flow cavities are provided, fluid sample and/or fluid buffer may be provided to each flow cavity from respective sample and/or buffer reservoirs via the respective inlets. The device may comprise a first flow cavity in fluid connection with a first fluid sample and a second flow cavity in fluid connection with a second fluid sample. The device may comprise a first flow cavity in fluid connection with a first fluid buffer and a second flow cavity in fluid connection with a second fluid buffer. The device may comprise a first flow cavity in fluid connection with a first test reagent and a second flow cavity in fluid connection with a second test reagent. The first test reagent may be a control reagent. The device may comprise a plurality of flow cavities comprising test areas to which different test materials are attached. The device may comprise a first flow cavity comprising a test area to which a first test material is attached and a second flow cavity comprising a test area to which a second test material is attached.

The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area.

When the objects are platelets, the test material can be:— annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

To determine the effect of test reagents on the objects, e.g. cellular, interactions, or the effect of specific cell fluorescence markers, or markers of cellular activation, it may be advantageous to provide a test reagent to the fluid sample. It is advantageous if said reagent can be provided economically to the device. The test reagent may be provided from a reservoir to the device via tubing or directly from a reservoir located on/within the device. The device may comprise a test reagent receiving reservoir in fluid connection with the flow cavity such that said test reagent can be provided to the fluid sample at a defined time period.

Advantageously the device of the present invention provides for significant reductions in fluid sample volume required when compared to existing commercial products. The hybrid nature of embodiments of the microfluidic device of the present invention can allow the advantages of polymer fabrication techniques to be utilised in conjunction with the advantages of glass-based systems. Furthermore, there may a significant reduction in the amount of hardware required, for example, there is no need for a vacuum pump for sealing the microfluidic device. Furthermore, the device can provide for the measurement of output of translocation velocities generated from data based on continual assessment of cell function, as opposed to single end point measurements and the shear force is independent of sample volume.

As will be appreciated, the device can be provided as a disposable or replaceable product or as part of an apparatus.

According to a second aspect of the present invention, there is provided an object/test material interaction system comprising a microfluidic device according to the first aspect of the present invention and a detection apparatus which is arranged to detect interactions of objects of a fluid sample in the microfluidic device with a test material of the test area of the microfluidic device.

Any detection apparatus may be used which is capable of detecting the object interactions. The detection apparatus may detect the object interactions through a layer of the microfluidic device which provides the test area. The detection apparatus may record images of the object interactions.

The detection apparatus may comprise a camera. The camera may be a CCD camera. The camera may detect the object interactions by detecting radiation, e.g. visible light, from the interacting objects. The camera may comprise a radiation direction device, e.g. one or more lens and/or filters and/or mirrors, which directs the radiation from the objects into an image capture element of the camera. The detection apparatus may comprise a microscope. The microscope may detect the object interactions by detecting radiation, e.g. visible light, from the interacting objects. The microscope may operate in a bright field mode and detect radiation comprising visible light. The microscope may operate in a fluorescent mode and detect radiation comprising fluorescent signals. The microscope may be an epi—fluorescent microscope. The microscope may comprise a radiation direction device, e.g. one or more lens and/or filters and/or mirrors, which directs the radiation from the objects into an image capture element of the microscope. The image capture element of the microscope may be a camera.

The system may comprise an excitation apparatus for exciting interacting objects to emit radiation. The excitation apparatus may comprise an excitation source such as a light emitting diode (LED) which emits excitation radiation to excite the interacting objects. The excitation apparatus may comprise a radiation direction device, e.g. one or more lens and/or filters and/or mirrors, which directs the excitation radiation from the excitation source to the objects.

The system may comprise a positioning apparatus to position the microfluidic device relative the detection apparatus. The positioning apparatus may position the microfluidic device relative the excitation apparatus. The positioning apparatus may comprise a shaped locating feature, for example a groove or protrusion, wherein the locating feature positions the microfluidic device relative to the detection apparatus. The positioning apparatus may comprise a platform on which the microfluidic device is placed and one or more stages connected to the platform to control directional movement of the platform in one or more dimensions.

The system may further comprise a heater, which supplies heat to the microfluidic device. The heater may be provided in or attached to the platform on which the device is placed. The heater may comprise resistive electrical coils, a printed pattern of resistive ink, or the like. The heater can be a resistive heater comprising a serpentine wire coated with a thermally conductive adhesive. The heater may be capable of regulating the temperature of sample fluid in the microfluidic device within the range 37° C. to 60° C., preferably around 37° C.

The system may comprise a fluid delivery system attached to one or more inlet or outlet of the microfluidic device. The fluid delivery system may be configured to control the flow rate of fluid sample and/or fluid buffer through the flow cavity of the microfluidic device. The fluid delivery system attached to an outlet of the microfluidic device may be a suction pump. The fluid delivery system attached to a sample and/or buffer inlet of the microfluidic device may be a pressure pump. The suction and pressure pumps can be a powered pump or a manually operated pump (such as a syringe).

The system may comprise software integrated within the system to allow control of the various parts of system, for example temperature control of the platform, pump control of injection of fluid into the device, calculations of flow rate within the device, control of the camera configuration such as capture parameters, and image processing. Each of these control areas have been modularised and can be used independently of, or in conjunction with, a main control.

The system may be used for detecting interactions of cells, or fragments thereof with the test material of the test area of the microfluidic device.

The inventors have determined that existing epi-fluorescent microscopes can be improved for use with the present invention.

Accordingly, a third aspect of the present invention provides an object/test material interaction system comprising a microfluidic device according to the first aspect of the present invention and an epi-fluorescent microscope.

The epi-fluorescent microscope may comprise an optics housing having at least one filter receiving means, e.g. at least one cavity adapted to receive at least one filter, such that the at least one filter is positionable in at least one of an excitation and an emission path length. The epi-fluorescent microscope may comprise a mirror receiving means, e.g. a mirror receiving cavity adapted to receive a mirror, such that said mirror is positionable to reflect emission light onto a detector. The filter receiving cavity and mirror receiving cavity may be provided by slots into which the appropriate filter or mirror respectively may be located. In particular embodiments, a cavity adapted to receive at least one filter such that the at least one filter is positionable in at least one of an excitation and an emission path length may be arranged to suitably locate additional excitation/emission filters to allow for detection of more than one type of fluorescent signal, for example a platelet specific fluorescence marker and activation-specific fluorescence marker.

According to a fourth aspect of the present invention there is provided a method for determining interactions of objects provided in a fluid sample with a test area to which at least one test material is attached, said method comprising the steps;
 providing the fluid sample to a flow cavity of a device according to the first aspect of the present invention,
 moving said fluid sample onto a test area of the device, and
 determining the interaction of objects of the fluid sample with the test material in the test area of the device.

The step of determining the interactions may be by visualisation of objects on the test area. This may be achieved by operating the system according to the second aspect of the present invention (i.e. by looking through the detection apparatus, or at the image(s) recorded by the detection apparatus). When images are recorded by the detection apparatus, a number of images at different time points may be recorded in order to determine movement of the objects. The movement and shapes of objects on the test area as they collide with and interact with the test material of the test area provides visual results that can identify the form of interaction taking place.

Visualisation of objects may be enhanced, and object-test material interactions more readily determined, by labelling the objects in the fluid sample with a colour or fluorescence marker. Thus, the method may include the step of mixing a colour or fluorescence marker with the fluid sample. This step may be carried out prior to, during, or after the step of providing the fluid sample to the flow cavity, but preferably before the step of moving said fluid sample onto a test area. For example, the fluid sample may be mixed with the colour or fluorescence marker:—outside of the device prior to the fluid sample being introduced into the sample inlet; between the sample inlet and the flow cavity (for example in a mixing well provided in the passage between the inlet and the flow cavity).

When visualising objects that include a fluorescence marker the method may include the step of shining radiation from an excitation radiation source on to the objects to excite the fluorescence marker. The radiation may be shone of the objects through appropriate excitation filters. The excitation radiation source may comprise part of the system of the second aspect of the invention. The excitation radiation source may for example be a blue-light emitting source, such as a diode or other suitable source. The detection apparatus may comprise emission filters, positioned such that the source directs radiation to pass therethrough before arriving at the device.

The method may include the step of providing a flow of fluid buffer in the flow cavity such that the fluid buffer is arranged to flow through the flow cavity on one or more sides of the fluid sample in the flow cavity, but not on the side of the fluid sample that contacts the test area.

The method may include the step of providing a flow of fluid buffer in the flow cavity that shapes or focuses the flow of fluid sample in the flow cavity in order to maximise contact between the fluid sample and the test area.

The method may include the step of providing a flow of fluid buffer in the flow cavity such that the fluid buffer is arranged to flow through the flow cavity on either side of a flow of the fluid sample. Thus, the fluid sample is kept from flowing along edge surfaces of the flow cavity by the flow of fluid buffer in the flow cavity.

In order to provide a flow of fluid buffer on either side of the flow of fluid sample in the flow cavity and flows of fluid buffer may be provided one on either side of the flow of fluid sample. This step may be carried out by supplying fluid buffer to two distinct buffer inlets that enter the flow cavity, or by supplying a single buffer inlet that is connected to a bifurcated flow cavity, as is discussed above in more detail in the connection with the first aspect of the present invention.

When the method includes the step of providing a flow of fluid buffer that both is arranged to flow on either side of a flow of fluid sample and on top of a flow of fluid sample, the flow of buffer fluid surrounds the fluid sample on three sides. Suitably 1% to 10% preferably 90% of the perimeter of the sample fluid is not surrounded by fluid buffer. This allows the fluid sample to contact the test material on the test area of the flow cavity, such that objects within the flow of fluid sample may contact and potentially interact with the test material of the test area. Suitably the width of the fluid sample in contact with the test material on the test area is approximately 2 μm to approximately 4 mm.

Suitably, mixing between the fluid sample and fluid buffer in the flow cavity should be minimised. Mixing of the flow of fluid sample and the flow of fluid buffer may be minimised due to the aforementioned dimensions of the flow cavity, which ensures the flow is predominantly laminar (smooth steady flow), such that any mixing is primarily based on diffusion. Diffusion requires a significantly longer time scale to mix fluids than the length of time the fluids remain in the cavity under flowing conditions.

The method may include the step of controlling the volume flow rate of the fluid sample passing through the flow cavity in order to achieve shear rates in the following range at the test area: 20 to 200 $s^{-1}$, 100 $s^{-1}$ to 200 $s^{-1}$, 200 to 600 $s^{-1}$, 600 $s^{-1}$ to 2000 $s^{-1}$, 1400 to 1600 $s^{-1}$, or 3000 to 10000 $s^{-1}$. Optionally, the shear rate is 1500 $s^{-1}$. Movement of said flow of fluid sample may be performed at an arterial, venous, or pathophysiological shear rate.

Details of fluid shear rates as may be provided within the device to model physiological conditions are provided in table 1.

TABLE 1

Ranges of Wall Shear Rate and Wall Shear Stresses, giving a blood viscosity of 0.38 Poise. Taken from Kroll MH, Hellums D, McIntire, LV, Schafer AI, & Moake JL, (1996), Blood 88 (5), pp1525-41.

| Blood Vessel | Wall Shear Rate (1/s) | Wall Shear Stress (dyne/cm$^2$) |
| --- | --- | --- |
| Large Arteries | 300-800 | 11.4-30.4 |
| Arterioles | 500-1600 | 19.0-60.8 |
| Veins | 20-200 | 0.76-7.6 |
| Stenotic Vessels | 800-10,000 | 30.4-380 |

Shear rate and shear stresses can be calculated for various parts of the vasculature (or indeed the device) from the known vascular diameter and volume flow rates. Calculations of shear rate and shear stress are typically based on a simplified model of steady flow and not pulsatile flow (i.e. intermittent propagation of the fluid sample/blood through the cavity/vessel) and assume laminar flow (branching and abnormal vascular curvature will cause transitional, or in extreme cases turbulent flow). However, the use of shear rates and shear stress allow a description of the effects of blood flow on platelet function. As will be appreciated by those of skill in the art, the method may include a step of intermittent propagation of the fluid sample through the cavity and/or to mimic more complex rheological properties of blood flow such as turbulent and disturbed blood flow, mimicking sites of branching, abnormal vasculature curvature or pathogenic conditions in a stenosed conditions in an artery.

The overall fluid flow rate of the fluid sample through the flow cavity may be controlled by controlling the pressure applied to fluid sample and/or fluid buffer at the inlet, and/or by a negative pressure applied to the fluid sample and/or fluid buffer at the outlet.

When the objects are cells, the step of determining may be measurement of at least one of the following functions of cellular activity:—initial cellular adhesion, cellular translocation, cellular velocity, cellular arrest, cellular morphology (e.g. cellular protrusions, blebs, filipodia), length of time the cell remains at the same location (i.e. amount of time platelet is stationary), rotational movements, side to side flipping mechanism, sliding cells, cellular detachment from the surface of the test area, cellular stability, measurement of single cell-test material interactions (i.e. from satellite cells) and cellular aggregates (cell-cell interactions, cellular micro-aggregates and macro-aggregates) on test area surface, and measurement of % surface area of coverage of the test area by cells.

When the objects are platelets, the step of determining may be measurement of at least one of the following functions of platelet activity:—initial platelet adhesion, platelet translocation, platelet velocity, platelet arrest, platelet morphology (e.g. platelet protrusions, blebs, filipodia), length of time a platelet remains at the same location (i.e. amount of time platelet is stationary), rotational movements, side to side flipping mechanism, sliding platelets, platelet detachment, thrombus stability, measurement of single platelet-test material interactions (i.e. satellite platelets) and platelet aggregates (platelet-platelet interactions, platelet micro-aggregates and macro-aggregates) on test area surface, and measurement of % surface area of coverage of the test area by platelets. Each of these activities may be significant in identifying and characterising the risk to a patient of a thrombotic event, and thus the risk for cardiovascular events.

The method can be used to identify the effect of a reagent on the aforementioned interaction of objects. Thus, the method can comprise the steps;

providing a first fluid sample to a flow cavity of a device of the first aspect,
moving said first fluid sample into a test area of the device,
determining the interaction of objects of the first fluid sample with the test material of the test area,
providing a reagent to a second fluid sample,
moving said second fluid sample into a test area of a device of the first aspect, and
determining the interaction of objects of the second fluid sample with the test material of the test are in the presence of reagent, and
comparing the interaction of the objects of the first fluid sample with the interaction of the objects of the second fluid sample.

Alternatively, the first fluid sample (e.g. blood) can be taken from a subject before administration of the reagent to the subject (i.e. subject not exposed to the reagent), and the second fluid sample can be taken from a subject following administration of the reagent to the subject. In which case, the step of providing a reagent to the second fluid sample may be omitted.

Thus, the method can comprise the steps:—
providing a first fluid sample obtained from a subject that has not been exposed to a reagent to a flow cavity of the device of the first aspect,
moving the first fluid sample into a test area of the device,
determining the interaction of objects of the first fluid sample with the test material of the test area,
providing a second fluid sample obtained from a subject that has been exposed to a reagent to a flow cavity of the device of the first aspect,
moving said second fluid sample into a test area of a device of the first aspect, and
determining the interaction of objects of the second fluid sample with the test material of the test area, and
comparing the interaction of the objects of the first fluid sample with the interaction of the objects of the second fluid sample.

The subject from which the first fluid sample is obtained may be the same or different to the subject from which the second fluid sample is taken.

The reagents may be anti-thrombotics and/or prohaemostatics.

The methods may further comprise the step of obtaining the first and second fluid samples.

According to a fifth aspect of the present invention there is provided the use of a method of the fourth aspect of the present invention for the diagnosis of thrombus development and dissolution (including platelet-mediated thrombus formation, coagulation-mediated thrombus formation), cardiovascular disease (such as stroke, cardiac ischemia, atherosclerosis, myocardial infarction, angina), changes to haemostatic mechanisms due to disease and drugs, platelet dysfunction and receptor abnormality, sensitivity to drug therapy (including anti-thrombotics and prohaemostatics), bleeding disorders (including Von Willebrand disease), stenosis, cancer (including tumour growth and metastasis) and platelet function disorders (such as Glanzman's Thrombasthenia, Bernard-Soulier syndrome, Storage Pool Disease) and diabetes mellitus.

The diagnostic methods may include the step of comparing the interaction of objects from a fluid sample obtained from a subject (e.g. a subject requiring diagnosis of a disease that can be indicated by aforementioned interactions of objects) with the interaction of objects from a control fluid sample, and providing a diagnosis based on the comparison. A control fluid sample exhibits normal object/test material interactions, for example, as obtained form a healthy subject. For example, when the objects are platelets, a sample from a subject that shows a decrease in platelet translocation, a decrease in platelet velocity, an increase in length of time a platelet remains at the same location (i.e. amount of time platelet is stationary), and/or an increase in platelet aggregates on test area surface, compared to that of the control fluid sample would indicate that the subject is experiencing an elevated level of thrombus development and so an increased risk of a thromobotic event, and thus the risk for cardiovascular events (and vice versa for bleeding disorders).

Thus, the method can comprise the steps:—
providing a fluid sample obtained from a subject to a flow cavity of a device of the first aspect,
moving said fluid sample into a test area of the device,
determining the interaction of objects of the fluid sample with the test material of the test area,
providing a control fluid sample to a flow cavity of a device of the first aspect,
moving the control fluid sample into a test area of the device,
determining the interaction of objects of the control fluid sample with the test material of the test area, and
comparing the interaction of the objects of the fluid sample with the interaction of the objects of the control fluid sample.

Alternatively, both fluid samples can be taken from the same subject but at different time periods. Such an analysis can be used to determine the progression or change of a disorder identified by the change in interactions between the two samples. The methods may therefore include the step of comparing the interaction of objects from a sample obtained from a subject with the interaction of objects from a sample obtained from the same subject at a later time, and providing a determination of the progression of change of a disorder based on the comparison.

Thus, the method can comprise the steps:—
providing a first fluid sample obtained from a subject to a flow cavity of a device of the first aspect,
moving said first fluid sample into a test area of the device,
determining the interaction of objects of the first fluid sample with the test material of the test area,
providing a second fluid sample obtained from the subject a period of time after the first fluid sample was obtained to a flow cavity of a device of the first aspect,
moving the second fluid sample into a test area of the device,
determining the interaction of objects of the second fluid sample with the test material of the test area, and
comparing the interaction of the objects of the first fluid sample with the interaction of the objects of the second fluid sample.

The period of time between obtaining the first and second fluid sample would be determined by the clinical need. It may be 1, 2, 3, 4, or 5 hours. It may be 1, 2, 3, 4, or 5 days. It may be 1, 2, 3, 4, or 5 months.

There is further provided the use of a method of the present invention in the treatment of diabetes mellitus, cancer, including tumour growth and metastasis, cardiovascular disease, and bleeding disorders, including Von Willebrand disease platelet disorders (such as Glanzman's Thrombasthenia, Bernard-Soulier syndrome, Storage Pool Disease). In such methods the results of the above diagnostic methods may direct a treatment regime, which may include the administration of therapeutically active agents (e.g. thrombotics and prohaemostatics)

The methods of the present invention may also be useful to study inflammatory-mediated responses, leukocyte recruitment, adhesion and migration on matrices and human vascular endothelial cell layers, platelet interactions with materials, for example catheter materials, stents etc.

Moreover, the methods of the invention may be used to evaluate and profile a patient's risk for cardiovascular diseases (CVD), to identify an individual at risk of having an atherothrombotic event, to identify aberrant platelet reactivity in an individual, to identify and correct inadequate or sub-optimal anti-platelet therapy in an individual, to assist in determining a clinical status of an individual comprising the step of determining the platelet function profile of the individual according to the method of the invention, and/or to determine whether an individual is at risk of bleeding during surgery.

According to any of the aspects of the present invention, the objects may be cells, for example blood cells (such as platelets or leukocytes) or cancer cells.

According to any of the aspects of the present invention, the fluid sample may be any fluid sample that contains blood cells (such as platelets and/or leukocytes). Thus, extracts of whole blood, suspensions of blood cells (such as platelets and/or leukocytes), diluted blood, or the like, may be used.

According to a sixth aspect of the invention there is provided a method of determining a trajectory of an object in a flowing fluid sample comprising a plurality of objects, the method comprising the steps of
(a) using a plurality of time sequential images of the flowing fluid sample and objects,
(b) for each time sequential image, processing the image to identify objects in the image and to determine approximate positions of the objects in the image,
(c) for a first pair of time sequential images comprising first and second images,
(i) determining for at least one object in the first image, a most-likely object in the second image which is the object in the second image which is most likely to be the same object as the object in the first image,
(ii) determining a sequential image trajectory of the at least one object between the first and second images to be a path between the approximate position of the at least one object in the first image and the approximate position of the most-likely object in the second image,
(d) repeating step (c) for one or more successive pairs of time sequential images, and
(e) for each pair of the time sequential images which produces a sequential image trajectory of the at least one object, determining the trajectory of the at least one object in the flowing fluid sample to be a concatenation of each sequential image trajectory of the at least one object.

Using the plurality of time sequential images may comprise using a detection apparatus to acquire the images, such as the detection apparatus of the system of the second aspect of the invention. The detection apparatus may be a CCD camera. The images may be produced using the device of the first aspect of the invention in a system of the second aspect of the invention.

Processing an image may comprise determining a threshold value to aid separation of objects in the image from background in the image, and processing the image using the threshold value. A threshold value may be determined for each image, and each image processed with its threshold value. In this way, objects may be reliably detected against a continuously changing background.

Processing an image to identify objects may comprise locating objects in the image which are in contact with an edge of the image, and discarding the objects in contact with an edge of the image from further analysis. Such objects are excluded from analysis for various reasons, for example because their centre of mass cannot be accurately determined.

Processing an image may comprise defining a shape criterion for objects in the image, and identifying only objects having a shape which at least substantially matches the shape criterion. For example, processing an image may comprise defining a circular shape criterion for objects, and identifying only objects having at least a substantially circular shape.

Processing an image may comprise defining a size criterion for objects in the image, and only identifying objects having a size which at least substantially matches the size criterion. For example, processing an image may comprise defining a size criterion for objects in the image comprising a minimum size and a maximum size, and only identifying objects having a size which falls between the minimum size and the maximum size. The object size criterion range may be applied to exclude objects in the image from analysis that are too small or too large to be an object of interest, e.g. a platelet.

Processing an image may comprise detecting objects in the image which are overlapping or touching, separating the objects, and identifying the separated objects as objects in the image. Detecting objects in the image which are overlapping or touching may comprise using the shape criterion and/or the size criterion. For example, detecting objects in the image which are overlapping or touching may comprise using the circular shape criterion and detecting substantially non-circular objects as touching or overlapping objects.

Processing an image to determine approximate positions of objects in the image may comprise generating (x, y) coordinates of the approximate positions of centroids of the objects. The (x, y) coordinates may be generated using the shape criterion. The (x, y) coordinates may be in units of pixels of the image. Processing an image may comprise determining an approximate size of objects in the image. Determining an approximate size of objects in the image may comprise using the shape criterion. For example, when the shape criterion defines an object shape to be circular, the shape criterion may be used to determine an approximate radial size of objects in the image. The size may be in units of pixels of the image.

Processing an image may comprise generating a test image comprising an image from which objects in contact with an edge of the image have been removed, and from which all identified objects have been removed. Subtracting off objects in this way provides a means of visualizing any missed objects as a test of processing quality.

Processing an image may comprise generating an object array comprising a list of each object and (x, y) coordinates of the approximate position of the centroid of each object in the image. The object array may further list an approximate size of each object.

Determining for the object in the first image, a most-likely object in the second image may comprise
(i) pairing the object in the first image with each of the objects in the second image,
(ii) calculating a probability value for each pair of objects using their approximate positions in the first and second images,
(ii) identifying the pair of objects which has a highest probability value, and
(iv) determining that the object in the second image of the pair is the most-likely object in the second image.

Calculating a probability value for each pair of objects using their approximate positions in the first and second images, may comprise calculating a probability value between 0 and 1.

Calculating a probability value for each pair of objects may comprise generating a probability array which comprises a list of each object and a calculated probability for each object.

Calculating a probability value for each pair of objects using their approximate positions in the first and second images, may comprise using a position-based probability function. The probability function may have parameters which are chosen to prefer downstream movement over cross-stream movement or upstream movement of an object. The probability function may comprise a cut-off distance which is used to negate any upstream movement of an object. The probability function emphasises the expected kinds of dynamics that exist in the flowing fluid sample. The probability function may be defined by $$p(\Delta x, \Delta y, t) = a\left(\exp\left[-\frac{(\Delta y - u\Delta t)^2}{\sigma_y^2}\right] \times \exp\left[-\frac{\Delta x^2}{\sigma_x^2 |\Delta y|}\right]\right) +$$
$$b\left(\exp\left[-\frac{(\Delta y - c)^2 + (\Delta x/d)^2}{\sigma_r^2}\right]\right)$$

when $\Delta y - u\Delta t > -y_c$ and $$= 0$$

when $\Delta y - u\Delta t \leq -y_c$ where p is the probability value, y is a coordinate axis in the flow direction of the fluid sample, x is a coordinate axis in the direction perpendicular to the flow direction of the fluid sample, $\Delta t$ is the period of time between subsequent images, $\Delta x$ is the distance moved in the x axis between images, $\Delta y$ is the distance moved in the y axis between images, $\sigma_y$ is the variance in movement in the y axis, $\sigma_x$ is the variance in movement in the x axis, $\sigma_r$ is the variance radially, u is the expected object velocity, $y_c$ is a cut-off parameter that artificially sets the probability function to zero, and a, b, c, and d are shaping parameters with a+b=1.

Optimal values of $\Delta y$, $\Delta x$, u, a, b, c, d, and $y_c$ may be chosen for each set of conditions under which images are acquired, for example magnification, acquisition rate. The optimal values are preferably held constant throughout the time taken to acquire all images.

The probability function may comprise a positional uncertainty term which accounts for inherent noise associated with determining the approximate positions of objects in an image. The term may define an uncertainty range of positions for an object and consider any objects whose positions fall within the range to have a high probability of being the same object. The uncertainty range may be one or more pixels to the left and to the right of a chosen position. Use of a positional uncertainty term in the probability function results in fewer 'broken' trajectories being determined. It has been found that the probability function used in the invention is improved over previously-published functions.

The method described above is repeated for one or more successive pairs of the time sequential images. Thus movement of the object between the successive images may be tracked. For each successive pair of the time sequential images which produces a sequential image trajectory of the object, a trajectory of the object in the flowing fluid sample is determined to be a concatenation of each sequential image trajectory of the object. An object trajectory in time and space is therefore produced.

For each pair of time sequential images, the method may further comprise determining if the highest probability value is greater than or equal to a threshold probability value. If the highest probability value is greater than or equal to a threshold probability value, the method may comprise determining the most-likely object in the second image of the pair of images, and determining a sequential image trajectory of an object between the pair of images to be a path between the approximate position of the object in a first image and the approximate position of the most-likely object in the second image. If the highest probability value is not greater than or equal to a threshold probability value, the method may comprise determining that no most-likely object in the second image exists, and no sequential image trajectory of the object between the pair of images is determined. Unpaired objects in the first image of any pair of images are considered to end their trajectory in the first image. Unpaired objects in the second image of any pair of images are considered to start their trajectory in the second image, i.e. be an object that was not previously in the field of view.

The above description concerns a method of determining a trajectory for one object in the flowing fluid sample. The method may be repeated for one or more further, e.g. all, objects in the first and subsequent images.

The method may comprise simultaneously determining a trajectory of each of a plurality of objects in a flowing fluid sample. This may comprise for each of a plurality of objects in a first image of a pair of images, determining a most-likely object in the second image. This may comprise pairing each object in the first image with each of the objects in the second image, calculating a probability value for each pair of objects, identifying a highest probability pair of objects which has a highest probability value, determining that the second object of the highest probability pair is the most-likely object in the second image for the first object of the pair, and determining a sequential image trajectory of the object. This may further comprise discarding the or each other pair of objects which comprise one of the objects of the highest probability pair, and identifying a further highest probability pair of objects which now has a highest probability value from remaining pairs of objects, and determining that the second object of this highest probability pair is the most-likely object in the second image for the first object of the pair. This may be repeated until there are no remaining pairs of objects, or until the probability values for each remaining pair of objects is less than a threshold probability value. The above may then be repeated for one or more successive pairs of time sequential images, and for each pair of the time sequential images which produces a sequential image trajectory of each object, determining the trajectory of each object in the flowing fluid sample.

Determining the trajectory of an object may further comprise generating a trajectory positional array which comprises a list of the objects and trajectory positional information for each object. The trajectory positional information may be in the form of a list of approximate positions of an object in one or more images. This provides a list of associated positions of an object over time.

The method may further comprise removing objects that intermittently touch the edge of an image, so-called 'blinking' objects, by removing from analysis all objects having trajectories lasting fewer than ten images.

The method may further comprise generating velocity measurements for each object for which a trajectory is determined. The method may further comprise generating a velocity array which comprises a list of the objects and velocity information for each object. The velocity information may be generated only for objects having a trajectory which comprises movement above a defined threshold movement. The velocity information may be in the form of a list of velocity measurements of an object between one or more images. This provides a list of velocity measurements of an object over time. The velocity measurements of an object may comprise zero velocity measurements for one or more periods where the object is stationary and non-zero velocity measurements for one or more periods where the object is moving. Thus data concerning periods where an object is moving, and data concerning periods where the object is stationary may be provided. Data concerning a percentage of trajectory points where the object is moving may also be provided. By separating periods of motion from non-motion for an object, velocity characteristics of the object become more definitive. The start-stop nature of movement of an object, for example the ratio of stationary periods to moving periods, can be a very important diagnostic measure for the object.

The velocity information may further comprise a measure of mean velocity over one or more images for one or more of the trajectories. The mean velocity may be calculated without using any zero velocity measurements. This will exclude any portions of a trajectory in which the object is not moving.

The velocity information may further comprise a measure of a fit to approximate non-zero velocity measurements of one or more trajectories. Changes in velocity characteristics of the trajectories may be detected that are not clearly reflected in a mean velocity measure.

Due to object size and shape, uncertainty or noise in the determined approximate position of each object can be significant. If a velocity measurement for an object is generated using the distance moved from one image to the next (determined from the approximate positions of the objects) divided by the amount of time between the images, the resultant velocity measurement will be heavily influenced by object positional noise. It will be difficult to distinguish between velocity measurements incorporating positional noise obtained for a non-moving object, and velocity measurements incorporating positional noise obtained for an object which is slow-moving. Each velocity measurement for an object may be generated using movement of the object, for example fluctuation of the position of the centroid of the object, over a plurality of images, for example five images. The method may comprise using these velocity measurements to distinguish between a slow-moving object and a non-moving object. This is possible as velocity measurements over a plurality of images for an object which is slow-moving will show downstream movement, whilst velocity measurements over a plurality of images for a non-moving object will show oscillation about a fixed object position, i.e. downstream movement will accumulate while noise will not.

Using such a noise correction smoothes out the velocity measurements generated for an object, greatly reducing the difficulty in separating motion from non-motion in the objects. Clearer periods of motion and non-motion in the velocity measurement information can be obtained. More accurate representation of the overall behaviour of the objects can also be obtained, which enables a number of measurements, such as the relative number of moving to non-moving objects, and an average velocity that only includes moving objects to be calculated. The method of separating noise from slow motion does not require knowledge of the length of time objects are stationary before moving above a certain threshold velocity and thus is independent of object binding constants or how many object binding events are active. This is in contrast with common practice, which is to look at the length of time objects are stationary before moving above a certain threshold velocity in an attempt to measure object binding constants. This is a noisy measurement, without knowledge of how many object binding events are active.

Generation of data concerning the trajectories of the objects can be based on all time points of the images. A low number of objects can therefore generate a high amount of trajectory positional and velocity data. This is key for measurements of objects in a system where there is a short initial interaction of objects.

The method may be used to determine a trajectory of an object comprising a cell in a flowing fluid sample. The cell trajectory may be used to determine interactions of the cell within the fluid sample. The fluid sample may be flowing past a test area and the cell trajectory may be used to determine interactions of the cell with at least one test material of the test area. The cell trajectory may be used to extract cell translocation behavior from the images.

The method may be used to determine a trajectory of an object comprising a blood platelet in a flowing fluid sample comprising a blood sample or a plasma sample. The platelet trajectory may be used to determine interactions of the platelet within the fluid sample. The fluid sample may be flowing past a test area and the platelet trajectory may be used to determine interactions of the platelet with at least one test material of the test area. The primary underlying forces may be drag on the fluid sample and bonding of a specific platelet receptor with the test material of the test area. The test area may comprise a test material comprising VWF and the platelet trajectory may be used to determine platelet-VWF interactions. The platelet trajectory may be used to extract platelet translocation behavior from the images. The platelet trajectory may elucidate the start-stop nature of platelet translocation, which is a meaningful measure in its own right. The platelet trajectory may elucidate flipping motion of ellipsoidal platelets as they proceed along the test area. The platelet trajectory may be used to track a variety of specific translocation characteristics that are associated with specific facets of the biology involved in the interaction between the platelet and the test area.

The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area.

When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

The method of this aspect of the invention allows when the objects are cells, measurement of at least one of the following functions of cellular activity:—initial cellular adhesion, cellular translocation, cellular velocity, cellular arrest, cellular morphology (e.g. cellular protrusions, blebs, filipodia), length of time the cell remains at the same location (i.e. amount of time platelet is stationary), rotational movements, side to side flipping mechanism, sliding cells, cellular detachment from the surface of the test area, cellular stability, measurement of single cell-test material interactions (i.e. from satellite cells) and cellular aggregates (cell-cell interactions, cellular micro-aggregates and macro-aggregates) on test area surface, and measurement of % surface area of coverage of the test area by cells.

The method of this aspect of the invention allows when the objects are platelets, measurement of at least one of the following functions of platelet activity:—initial platelet adhesion, platelet translocation, platelet velocity, platelet arrest, platelet morphology (e.g. platelet protrusions, blebs, filipodia), length of time a platelet remains at the same location (i.e. amount of time platelet is stationary), rotational movements, side to side flipping mechanism, sliding platelets, platelet detachment, thrombus stability, measurement of single platelet-test material interactions (i.e. satellite platelets) and platelet aggregates (platelet-platelet interactions, platelet micro-aggregates and macro-aggregates) on test area surface, and measurement of % surface area of coverage of the test area by platelets. Each of these activities may be significant in identifying and characterising the risk to a patient of a thrombotic event, and thus the risk for cardiovascular events.

The method of this aspect of the invention allows for an objective, accurate and reproducible measurement scheme that is reliable with the short flow assays appropriate for whole blood.

According to an seventh aspect of the present invention there is provided a computer program comprising instructions for carrying out the method of the sixth aspect of the invention when the computer program is executed on a programmable apparatus.

According to an eighth aspect of the invention there is provided a method of determining interactions of an object in a flowing fluid sample comprising a plurality of objects, the method comprising the steps of
(a) using a plurality of time sequential images of the flowing fluid sample and objects, and for each time sequential image,
(b) processing the image to identify objects in the image and to determine approximate positions of the objects in the image,
(c) breaking the image into an array of object-sized regions,
(d) for each region of the array of an image, determining continuous periods of vacancy time when the region is empty and determining continuous periods of residence time when the region contains an object,
(e) for all of the time sequential images, arranging the periods of vacancy time and the periods of residence time in a descending order and assigning a number n from 1 to N to the periods,
(f) plotting a graph of the periods of vacancy time and the periods of residence time against the natural log of the assigned number n of each period divided by the total number N, and
(g) applying a linear fit of a line to the graph to provide a time constant which is used to determine interactions of the object in the flowing fluid sample.

If the periods of vacancy time and the periods of residence time form a Poisson distribution, plotting these periods versus ln(n/N) will result in a straight line which can be fit to extract a time constant. The shape of the line may be used to determine interactions of the object in the flowing fluid sample. The slope of the line may be used to determine interactions of the object in the flowing fluid sample. This is so as the shape/slope of the line and therefore the time constant will be heavily influenced by binding constants involved in the object interactions. As such, changes in the shape and/or slope of this line has diagnostic potential.

Advantageously, this method does not require determination of trajectories of objects in the flowing fluid sample, and thus provides an option to detect changes in object interaction with reduced processing requirements which is much faster to run.

The method may comprise removal of objects from the images, which objects would result in large numbers of false short residency/vacancy periods. For example, 'blinking' objects which are in proximity to an edge of an image would greatly affect this method (giving a large number of false short residency/vacancy periods) if these were not removed from the images. Although ideally the method does not comprise determination of object trajectories, these may be generated and may be used to filter certain types of noise from the images, for example noise due to poorly tracked objects.

The method may be used to determine interactions of an object comprising a cell in a flowing fluid sample. The fluid sample may be flowing past a test area and the method may be used to determine interactions of the cell with at least one test material of the test area.

The method may be used to determine interactions of an object comprising a blood platelet in a flowing fluid sample comprising a blood sample or a plasma sample. The fluid sample may be flowing past a test area and the method may be used to determine interactions of the platelet with at least one test material of the test area. The test area may comprise a test material comprising VWF and the method may be used to determine platelet-VWF interactions.

The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area.

When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

The method of this aspect of the invention allows when the objects are cells, measurement of at least one of the following functions of cellular activity:—initial cellular adhesion, cellular translocation, cellular velocity, cellular arrest, cellular morphology (e.g. cellular protrusions, blebs, filipodia), length of time the cell remains at the same location (i.e. amount of time platelet is stationary), rotational movements, side to side flipping mechanism, sliding cells, cellular detachment from the surface of the test area, cellular stability, measurement of single cell-test material interactions (i.e. from satellite cells) and cellular aggregates (cell-cell interactions, cellular micro-aggregates and macro-aggregates) on test area surface, and measurement of % surface area of coverage of the test area by cells.

The method of this aspect of the invention allows when the objects are platelets, measurement of at least one of the following functions of platelet activity:—initial platelet adhesion, platelet translocation, platelet velocity, platelet arrest, platelet morphology (e.g. platelet protrusions, blebs, filipodia), length of time a platelet remains at the same location (i.e. amount of time platelet is stationary), rotational movements, side to side flipping mechanism, sliding platelets, platelet detachment, thrombus stability, measurement of single platelet-test material interactions (i.e. satellite platelets) and platelet aggregates (platelet-platelet interactions, platelet micro-aggregates and macro-aggregates) on test area surface, and measurement of % surface area of coverage of the test area by platelets. Each of these activities may be significant in identifying and characterising the risk to a patient of a thromobotic event, and thus the risk for cardiovascular events.

According to an ninth aspect of the present invention there is provided a computer program comprising instructions for carrying out the method of the ninth aspect of the invention when the computer program is executed on a programmable apparatus.

DETAILED DESCRIPTION OF THE INVENTION

Embodiments of the present invention will now be described with reference to the following figures and examples which are provided for the purpose of illustration and are not intended to be construed as being limiting on the present invention.

BRIEF DESCRIPTION OF THE DRAWINGS

FIGS. 1 and 2 show a first embodiment of a microfluidic device. The microfluidic device 1 is in the form of a planar platform, and comprises three layers, a first outer layer 2, a second outer layer 3 and an interposed layer 4.

Figure 1:
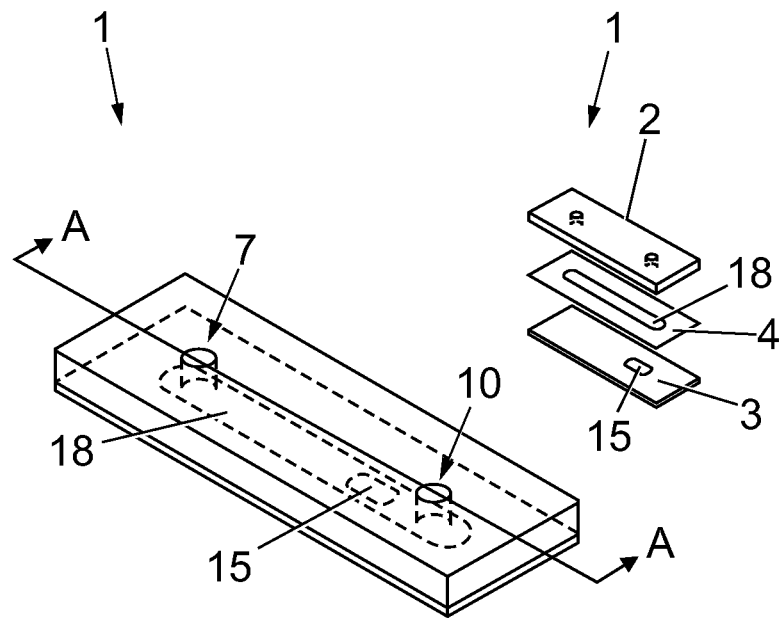
FIG. 1 is a perspective view of a schematic representation of a first embodiment of the device of the present invention.

The first outer layer 2 of the device 1 comprises a 6 mm thick Poly(methyl methacrylate) elongate plate, machined 75 mm in length by 25 mm wide, and comprising a first elongate surface 5 and a second elongate surface 6. The first outer layer 2 provides a sample inlet 7 of the device 1, comprising a sample inlet passage 8 and a sample inlet port 9. The sample inlet passage 8 passes through the first outer layer 2 from the first surface 5 of the layer to the second surface 6 of the layer. The sample inlet port 9 is defined by the sample inlet passage 8 in the first surface 5 of the first outer layer 2. The sample inlet passage 8 is machined through the first outer layer 2 and tapped to incorporate M5 fittings to allow quick connection of the device 1 to fluid delivery systems. The first outer layer 2 provides an outlet 10 of the device 1, comprising an outlet passage 11 and an outlet port 12. The outlet passage 11 passes through the first outer layer 2 from the first surface 5 of the layer to the second surface 6 of the layer. The outlet port 12 is defined by the outlet passage 11 in the first surface 5 of the first outer layer 2.

The second outer layer 3 of the device 1 comprises an elongate glass slide, comprising a first elongate surface 13 and a second elongate surface 14. It will be appreciated that the material of the second outer layer 3 can be selected from a range of materials, such as polymer or glass. The choice of material allows a user of the device the flexibility to develop custom chemistries for their specific application. The second outer layer 3 provides a test area 15 of the device 1, on the first surface 13 of the second outer layer 3. The test area 15 has at least one test material attached to it. The test material may be any suitable activating material, including but not limited to, platelet activating protein, such as von Willebrand Factor (vWF), vascular matrix collagens, catheter materials, stent materials, tissue factors and phospholipids, vascular endothelial cell and extracellular matrices, and sections of human artery plaque materials. The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area. When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

In the device 1 the second outer layer 3 provides a test area 15 which is coated with vWF test material.

The interposed layer 4 of the device 1 comprises an approximately 50 µm thick elongate plate, comprising a first elongate surface 16 and a second elongate surface 17. The interposed layer 4 is a pressure-sensitive adhesive (PSA) layer. The interposed layer 4 is laser-patterned to define an aperture 18 through the layer 4 from the first surface 16 thereof to the second surface 17 thereof. The aperture 18 has a width of approximately 2 mm.

The device 1 is assembled by pressing the first and second outer layers 2, 3 onto the interposed layer 4. The second elongate surface 6 of the first outer layer 2 is pressed onto the first elongate surface 16 of the interposed layer 4, and the first elongate surface 13 of the second outer layer 3 is pressed onto the second elongate surface 17 of the interposed layer 4.

The pressure-sensitive adhesive provided on each surface of the interposed layer 4 holds the first and second outer layers 2, 3 onto the interposed layer 4. Preferably in use the device 1 is oriented such that the first outer layer 2 forms a top layer of the device 1, and the second outer layer 3 forms a base layer of the device 1.

As assembled, the first and second outer layers 2, 3 and the interposed layer 4 define a flow cavity 19 of the device 1. The first elongate surface 13 of the second outer layer 3 provides a first surface of the flow cavity 19, the second elongate surface 6 of the first outer layer 2 provides a second surface of the flow cavity 19, and an internal surface 20 of the aperture 18 of the interposed layer 4 provides edge surfaces of the flow cavity 19. The flow cavity 19 thus formed runs a substantially straight course, and is connected at a first end to the sample inlet 7 and at a second end to the outlet 10. The flow cavity 19 fluidly connects the sample inlet 7 to the outlet 10, for flow of fluid sample through the flow cavity 19. The flow cavity 19 is largely sealed from the external environment around the device 1. The flow cavity 19 has an aspect ratio which is adapted to provide a substantially constant shear force between the test area 15 and fluid sample flowing over the test area 15, for example, the flow channel 19 may have a height of approximately 50 µm and a width of approximately 2 mm.

In use, a user introduces a fluid sample into the device 1. In this embodiment, the fluid sample comprises a blood sample and objects in the fluid sample are blood platelets; interaction of the platelets with the vWF test material are of interest. The blood sample is introduced into the sample inlet 7 through the sample inlet port 9 and from there into the sample inlet passage 8. The blood sample flows from the sample inlet passage 8 into the flow cavity 19. The blood sample is drawn through the flow cavity 19 at a chosen flow rate of 0.075 ml/min, using, for example, a Harvard PhD2000/2200 syringe pump connected to the outlet 10. The flow rate is chosen to mimic the flow rate experienced by platelets in an artery, where arterial shear rate is 1500 $s^{-1}$. Compared to the Glycotech chamber, the flow rate can be reduced from 2.4194 ml/min to 0.075 ml/min (~30-fold).

Figure 2:
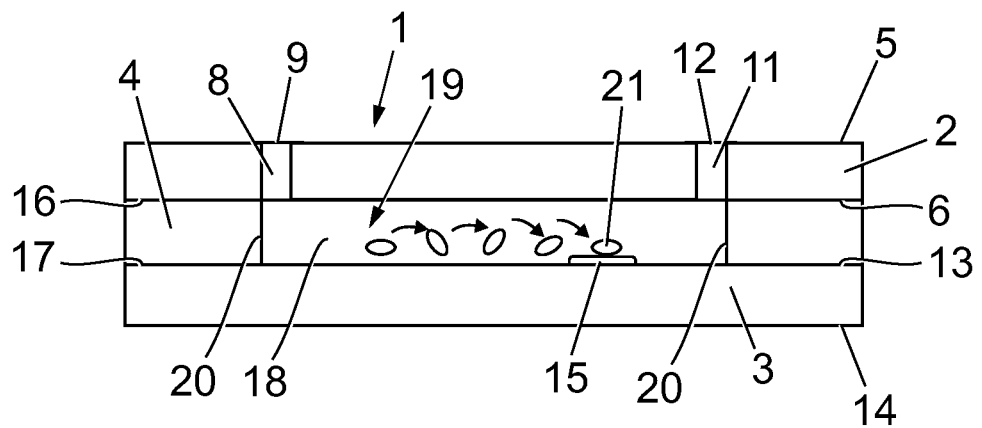
FIG. 2 is a cross-sectional view of the device of FIG. 1.

The blood sample flows over the second elongate surface 13 of the second outer layer 3. FIG. 2 shows a single platelet 21 translocating over time along the second surface 13 of the second outer layer 3. Fluidic drag will cause the platelet 21 to role across the surface 13. The test area 15 is provided on the second surface 13 of the second outer layer 3. The blood sample flows over the test area, and platelets 21 in the blood sample interact with the vWF test material coated on the test area 15. The flow cavity 19 is dimensioned such that the blood sample will be subjected to a substantially constant shear force in the region of the test area 15. Interactions between the platelets and the test material can be inspected using a suitable detector such as an imaging device.

The nature of the fabrication techniques used in the device 1, lends itself very well to custom-designed, batch production of such a device. The flexible manufacturing process allows a hybrid polymer-glass device to be produced. The device may therefore be provided as a disposable or replaceable product. The device may be provided to a user in a preassembled form, with one or more test materials already provided on the test area. Alternatively, the device may be provided to a user in an unassembled form, either with one or more test materials provided on the test area, or the user may provide one or more test materials on the test area. When two or more test materials are provided on the test area, the advantages of the each of the test materials can be exploited in a single device.

In the device 1, a fluid buffer is not used. Although this means that a greater volume of fluid sample is required, the required fluid sample volume nevertheless remains over 30-fold less than that required in commercial systems, due to the dimensions chosen for the device 1. The device 1 therefore allows a user to test significantly lower volumes of fluid sample using a familiar system and without the additional steps required for the dual flow device. Advantageously, the device is compatible with existing interaction detection systems.

Figure 3:
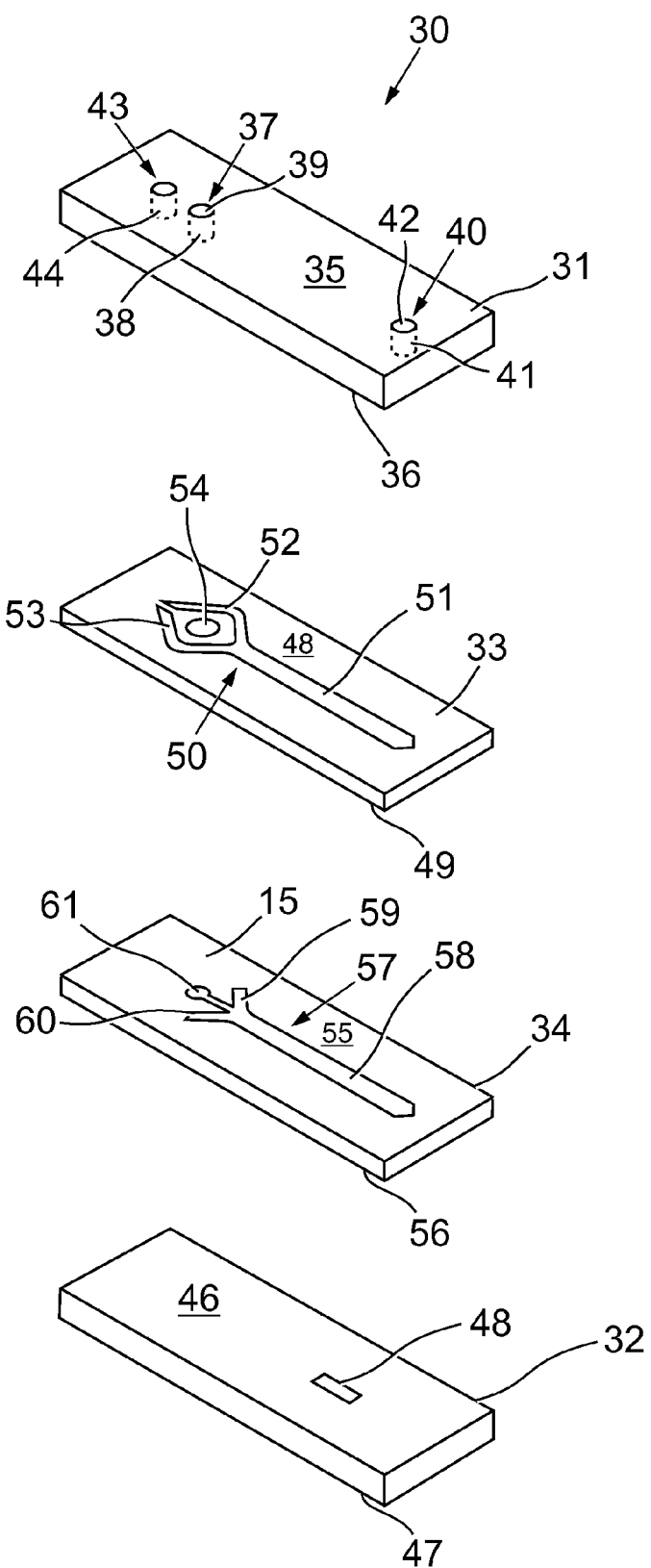
FIG. 3 is an exploded perspective view of a schematic representation of a second embodiment of the device of the present invention.
Figure 4:
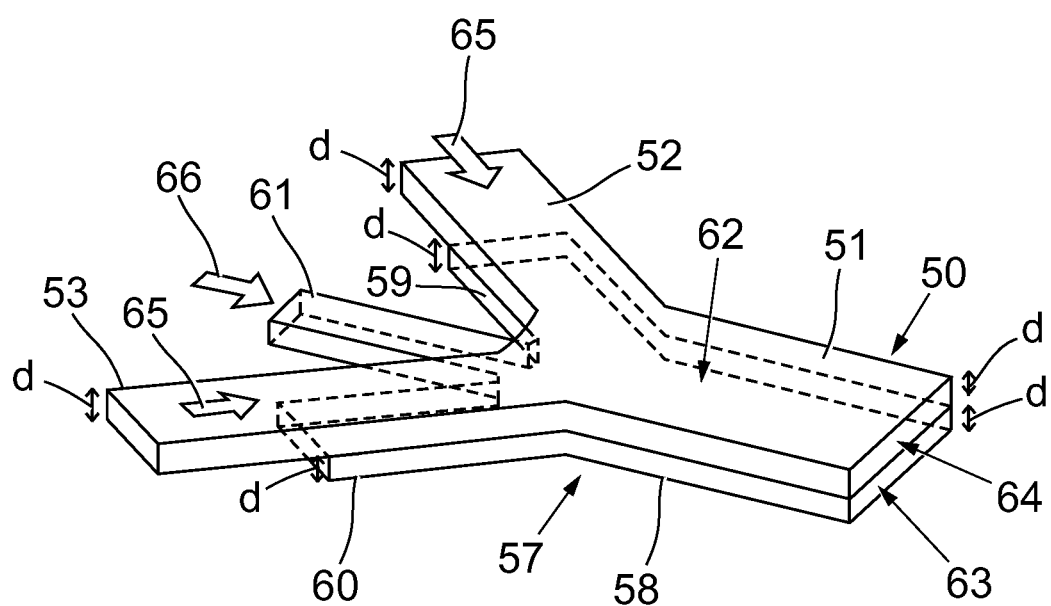
FIG. 4 is a perspective view of a part of the device of FIG. 3.

FIGS. 3 and 4 show a second embodiment of a microfluidic device. The microfluidic device 30 comprises four layers, a first outer layer 31, a second outer layer 32, a first interposed layer 33, and a second interposed layer 34.

The first outer layer 32 of the device 30 again comprises a 6 mm thick Poly(methyl methacrylate) elongate plate, machined 75 mm in length by 25 mm wide, and comprising a first elongate surface 35 and a second elongate surface 36. The first outer layer 32 provides a sample inlet 37 of the device 30, comprising a sample inlet passage 38 and a sample inlet port 39. The sample inlet passage 38 passes through the first outer layer 32 from the first surface 35 of the layer to the second surface 36 of the layer. The sample inlet port 39 is defined by the sample inlet passage 38 in the first surface 35 of the first outer layer 32. The sample inlet passage 38 is machined through the first outer layer 32 and tapped to incorporate M5 fittings to allow quick connection of the device 30 to fluid delivery systems. The first outer layer 32 provides an outlet 40 of the device 30, comprising an outlet passage 41 and an outlet port 42. The outlet passage 41 passes through the first outer layer 32 from the first surface 35 of the layer to the second surface 36 of the layer. The outlet port 42 is defined by the outlet passage 41 in the first surface 35 of the first outer layer 22. The first outer layer 32 further provides a buffer inlet 43 of the device 30, comprising a buffer inlet passage 44 and a buffer inlet port 45. The buffer inlet passage 44 passes through the first outer layer 32 from the first surface 35 of the layer to the second surface 36 of the layer. The buffer inlet port 45 is defined by the buffer inlet passage 44 in the first surface 35 of the first outer layer 32. The buffer inlet passage 44 is also machined through the first outer layer 32 and tapped to incorporate M5 fittings to allow quick connection of the device 30 to fluid delivery systems.

The second outer layer 32 of the device 30 comprises an elongate glass slide, comprising a first elongate surface 46 and a second elongate surface 47. It will again be appreciated that the material of the second outer layer 32 can be selected from a range of materials, such as polymer or glass. The choice of material allows a user of the device the flexibility to develop custom chemistries for their specific application. The second outer layer 32 provides a test area 48 of the device 30, on the first surface 46 of the second outer layer. The test area 48 has at least one test material attached to it. The test material may be any suitable activating material, including but not limited to, platelet activating protein, such as von Willebrand Factor (vWF), vascular matrix collagens, catheter materials, stent materials, tissue factors and phospholipids, vascular endothelial cell and extracellular matrices, and sections of human artery plaque materials. The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area. When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

In the device 30 the second outer layer 32 provides a test area 48 which is coated with vWF test material.

The first interposed layer 33 of the device 30 comprises an approximately 50 μm thick elongate plate, comprising a first elongate surface 48 and a second elongate surface 49. The first interposed layer 33 is a pressure-sensitive adhesive (PSA) layer. The first interposed layer 33 is laser-patterned to define a bifurcated aperture 50 through the layer 33 from the first surface 48 thereof to the second surface 49 thereof. The aperture 50 has a width of approximately 2 mm. The first interposed layer 33 defines a bifurcated aperture 50 comprising a main channel 51 and a first branch 52 and a second branch 53 connected to the main channel 51. The first branch 52 and the second branch 53 are arranged at an angle of approximately 45° to the main channel 51, such that together they form a substantially "Y" shape. The first interposed layer 33 further defines a substantially circular aperture 54 through the layer 33 from the first surface 48 thereof to the second surface 49 thereof. The substantially circular aperture 54 is positioned between the first branch 52 and the second branch 53.

The second interposed layer 34 of the device 30 comprises an approximately 50 μm thick elongate plate, comprising a first elongate surface 55 and a second elongate surface 56. The second interposed layer 34 is a pressure-sensitive adhesive (PSA) layer. The second interposed layer 34 is laser-patterned to define a bifurcated aperture 57 through the layer 34 from the first surface 55 thereof to the second surface 56 thereof. The aperture 57 has a width of approximately 2 mm. The second interposed layer 34 defines a bifurcated aperture 57 comprising a main channel 58 and a first branch 59 and a second branch 60 connected to the main channel 58. The first branch 59 and the second branch 60 are arranged at approximately 90° to each other and at an angle of approximately 45° to the main channel 58, such that together they form a substantially "Y" shape. The second interposed layer 34 further defines an aperture 61 through the layer 34 from the first surface 55 thereof to the second surface 56 thereof. The aperture 61 is positioned between the first branch 59 and the second branch 60.

The device 30 is assembled by pressing the layers together. The second elongate surface 49 of the first interposed layer 33 is pressed onto the first elongate surface 55 of the second interposed layer 34. The second elongate surface 36 of the first outer layer 31 is pressed onto the first elongate surface 48 of the first interposed layer 33. The first elongate surface 46 of the second outer layer 32 is pressed onto the second elongate surface 56 of the second interposed layer 34. Pressure-sensitive adhesive provided on each surface of the interposed layers 33, 34 holds them together and holds the first and second outer layers 31, 32 onto the interposed layers. Preferably in use the device 30 is oriented such that the first outer layer 31 forms a top layer of the device 30, and the second outer layer 32 forms a base layer of the device 30.

As assembled, the second surface 36 of the first outer layer 31 abuts and substantially seals the bifurcated aperture 50 of the first interposed layer 33 along the first surface 48 of the first interposed layer 33. The first surface 46 of the second outer layer 32 abuts and substantially seals the bifurcated aperture 57 of the second interposed layer 34 along the second surface 56 of the second interposed layer 34. The bifurcated aperture 50 of the first interposed layer 33 and the bifurcated aperture 57 of the second interposed layer 34 are substantially aligned. The first branch 52 and the second branch 53 of the aperture 50 of the first interposed layer 33 respectively meet and connect to the first branch 59 and the second branch 60 of the aperture 57 of the second interposed layer 34. The substantially circular aperture 54 of the first interposed layer 33 meets and connects to the aperture 61 of the second interposed layer 34. The aperture 61 of the second interposed layer 34 is connected to the main channel 58 of the aperture 57 of the second interposed layer 34.

The first and second outer layers 31, 32 and the first and second interposed layers 33, 34 define a flow cavity 62 of the device 1. The first elongate surface 46 of the second outer layer 32 provides a first surface of the flow cavity 62, the second elongate surface 36 of the first outer layer 31 provides a second surface of the flow cavity 62, and internal surfaces of the bifurcated aperture 50 of the first interposed layer 33 and the bifurcated aperture 57 of the second interposed layer 34 provide edge surfaces of the flow cavity 62. The flow cavity thus comprises a first portion 63 substantially bounded by the first elongate surface 46 of the second outer layer 32 and the internal surface of the bifurcated aperture 57 of the second interposed layer 34, and a second portion 64 substantially bounded by the second elongate surface 36 of the first outer layer 31 and the internal surface of the bifurcated aperture 50 of the first interposed layer 33.

The flow cavity 62 has a height equal to the thickness of the first interposed layer 33 and the thickness of the second interposed layer 34. The flow cavity 62 has an aspect ratio which is adapted to provide a substantially constant shear force between the test area 48 and fluid sample flowing over the test area 38, for example, the flow cavity 62 may have a height of approximately 50 μm and a width of approximately 2 mm. The flow cavity 62 is largely sealed from the external environment around the device 30.

The sample inlet passage 38 in the first outer layer 31 meets and connects to the substantially circular aperture 54 of the first interposed layer 33, which in turn meets and connects to the aperture 61 of the second interposed layer 34, which in turn meets the first elongate surface 46 of the second outer layer 32. A sample channel is thus formed from the sample inlet port 39 of the first outer layer 31 to the first elongate surface 46 of the second outer layer 32. The sample channel tapers in the direction away from the sample inlet port 39. Fluid sample introduced into the device 30 via the sample inlet port 39 flows along the sample channel and into the first path 63 of the flow cavity 62 of the device 30.

The outlet passage 41 in the first outer layer 31 meets and connects to an end of the main channel 51 of the aperture 50 of the first interposed layer 33. As the bifurcated aperture 50 of the first interposed layer 33 and the bifurcated aperture 57 of the second interposed layer 34 are aligned, an outlet channel is formed from the main channel 51 of the aperture 50 of the first interposed layer 33, and the main channel 58 of the aperture 57 of the second interposed layer 34, to the outlet passage 41. Fluid flowing in the first path 63 of the flow cavity 62 of the device 30 (formed in part by the main channel 58 of the aperture 57 of the second interposed layer 34), and fluid flowing in the second path 64 of the flow cavity 62 of the device 30 (formed in part by the main channel 51 of the aperture 50 of the first interposed layer 33) flows from the flow cavity 62 into the outlet channel and exits the device 30 via the outlet port 42.

The buffer inlet passage 44 in the first outer layer 31 meets and connects to ends of the first branch 52 and the second branch 53 of the bifurcated aperture 50 of the first interposed layer 33 (as shown), which in turn respectively meet and connect to the first branch 59 and the second branch 60 of the bifurcated aperture 57 of the second interposed layer 34. The first branch 59 and the second branch 60 connect to the main channel 58 of the aperture 57 of the second interposed layer 34. The first branch 52 and the second branch 53 connect to the main channel 51 of the aperture 50 of the first interposed layer 33. Fluid buffer introduced into the device 30 via the buffer inlet port 42 flows along the buffer inlet passage 44 and flows along the buffer inlet passage 44 and into the branches 52, 53 and the main channel 51 of the bifurcated aperture 50 of the first interposed layer 33, i.e. into the second portion 64 of the flow cavity 62. Fluid buffer introduced into the device 30 via the buffer inlet port 42 further flows along the buffer inlet passage 44 into the branches 59, 60 and the main channel 58 of the bifurcated aperture 57 of the second interposed layer 34, i.e. into the first portion 63 of the flow cavity 62.

The first and second portions 63, 64 of the flow cavity 62 of the device 30 are arranged such that flow of the fluid buffer therein shapes flow of the fluid sample therein to direct the fluid sample towards and onto the first surface 46 of the second outer layer 32, where the test area 48 is situated, and away from edge surfaces of the flow cavity 62. The first portion 63 of the flow cavity 62 is formed from the first surface 46 of the second outer layer 32 and the internal surface of the bifurcated aperture 57 of the second interposed layer 34, and has a height d which is the thickness of the second interposed layer 34. The second path 64 of the flow cavity 62 is formed from the second surface 36 of the first outer layer 31 and the internal surface of the bifurcated aperture 50 of the first interposed layer 33, and has a height d which is the thickness of the first interposed layer 33. It will be appreciated that the thickness of the layers and therefore the heights of the paths may be different.

Parts of the first and second interposed layers 33, 34 which define the bifurcated parts of the apertures 50, 57 and therefore parts of the first and second portions 63, 64 of the flow cavity 62, are arranged as shown in FIG. 4. The height of each aperture 50, 57 is d, i.e. the thickness of each of the first and second interposed layers 33, 34. It can be seen that the main channels 51, 58 of the apertures 50, 57 align to form parts of the first and second portions 63, 64 each of height d, and a part of the flow cavity 62 having a total height of 2 d. The first and second branches 59, 60 of the aperture 57 and parts of the first and second branches 52, 53 of the aperture 50 also align to form part of the first and second portions 63, 64 each of height d, and a part of the flow cavity 62 having a total height of 2 d. The first and second branches 52, 53 of the aperture 50 extend beyond the first and second branches 59, 60 of the aperture 57, to form part of the first and second portions 63, 64 each of height d. The first and second branches 52, 53 of the aperture 50 extend as shown in FIG. 3, to connect to the buffer inlet passage 44. The aperture 61 defined in the second interposed layer 34 also has a height of d equal to the thickness of the second interposed layer 34, and connects to the first and second branches 59, 60 of the aperture 57. The width of the aperture 61 is less than that of the branches of the apertures 50, 57.

The arrows 65 shown in FIG. 4 depict the flow of fluid buffer, and the arrow 66 depicts the flow of fluid sample in the part of the device 30 illustrated in the figure. Fluid sample enters the aperture 61 and flows at least substantially into a part of the first portion 63 of the flow cavity 62 defined by the main channel 58 of the aperture 57 of the second interposed layer 34. Fluid buffer enters and flows along a part of the second portion 64 of the flow cavity 62 defined by the first and second branches 52, 53 of the aperture 50, until a point of each branch where they align with the first and second branches 59, 60 of the aperture 57. Here, the fluid buffer continues at least in part to flow along the part of the second portion 64 of the flow cavity 62 defined by the first and second branches 52, 53 of the aperture 50, but also flows into and along a part of the first portion 63 of the flow cavity 62 defined by the first and second branches 59, 60 of the aperture 57. At a point where the aperture 61 and the branches of the apertures 50, 57 all meet, the aperture 61 connects to a central part of the first portion 63 of the flow cavity 62 defined by the main channel 58 of the aperture 57, the branches 59, 60 connect to side parts of the first portion 63 of the flow cavity 62 defined by the main channel 58 of the aperture 57 which are situated on either side of the central part of the first portion 63 of the flow cavity 62, and the branches 52, 53 connect to the second portion 64 of the flow cavity 62 defined by the main channel 51 of the aperture 50. The fluid buffer will therefore flow along the second portion 64 of the flow cavity 62 and along the side portions of the first portion 63 of the flow cavity 62. The fluid sample will flow along the central part of the first portion 63 of the flow cavity 62. Thus arrangement of the portions of the flow cavity results in the fluid buffer surrounding the fluid sample on three sides, and shaping the flow of the fluid sample to direct the fluid sample towards and onto the first surface 46 of the second outer layer 32, where the test area 48 is situated, and away from edge surfaces of the first portion 63 of the flow cavity 62.

Figure 5:
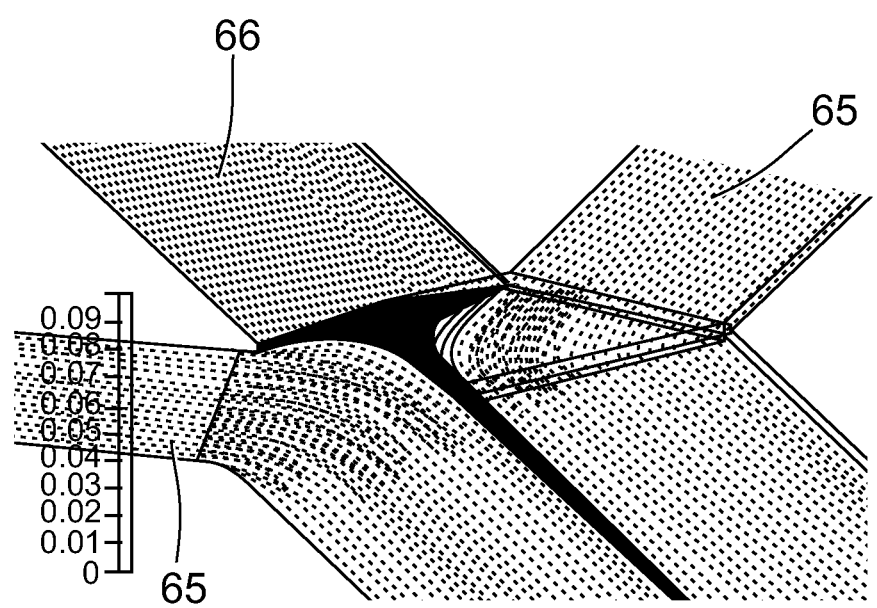
FIG. 5 is a computational fluid dynamic (CFD) simulation of flow of fluid sample and fluid buffer through the part of the device of FIG. 4.

FIG. 5 is a computational fluid dynamic (CFD) simulation showing how the fluid buffer and fluid sample interact in the part of the device 30 shown in FIG. 4. The arrows 65 depict the flow of fluid buffer, and the arrow 66 depicts the flow of fluid sample. This illustrates that the fluid buffer flows on either side and on top of the fluid sample. At higher fluid buffer to fluid sample ratios, the fluid buffer begins to surround the fluid sample both from two sides and on top. At a fluid buffer to fluid sample ratio of 2:1, the fluid buffer influences the fluid sample flow more predominantly. At fluid buffer to fluid sample ratios of greater than 10:1, the fluid sample flow becomes shaped both vertically and horizontally while still maintaining contact with the test area. While experimental validation of this is difficult to obtain, initial experimental data comparing flow widths showed reasonable correlation with the simulated data.

At least two potential modes of operation of the device 30 of FIG. 3 can be implemented depending on the fluid sample volume and operating conditions. A first potential mode of operation is dual pump operation. In the dual pump mode, a pump is connected to each of the sample inlet 37 and the buffer inlet 43. Based on the ratio of flow rates as outputted by the pumps, the fluid sample flow can be either increased or decreased. This mode gives a user excellent resolution over the fluid sample width at the expense of the relatively large dead volume of fluid sample contained in a syringe and extraneous tubing used to introduce the fluid sample into the sample inlet 37. The second potential mode of operation is single pump operation. In the single pump mode, a head of pressure is applied to the buffer inlet 43. Fluid buffer is introduced into the buffer inlet 43. Fluid sample is applied to the sample inlet 37. A negative pressure is then applied to the outlet 40, causing both fluid sample and fluid buffer to flow through the flow cavity 62 of the device 30. For any given shear rate as determined by the negative pressure, the fluid sample flow is determined by the pressure head on the buffer inlet 43.

In use, a user introduces a fluid sample and a fluid buffer into the device 30. In this embodiment, the fluid sample comprises a blood sample and objects in the fluid sample are blood platelets; interaction of platelets in the blood sample with the vWF test material are of interest. The blood sample is introduced into the sample inlet 37 through the sample inlet port 39 and from there into the sample inlet passage 38. The blood sample flows from the sample inlet passage 38 into the flow cavity 62, as described above. The fluid buffer is introduced into the buffer inlet 43 through the buffer inlet port 45 and from there into the buffer inlet passage 44. The fluid buffer flows from the buffer inlet passage 44 into the flow cavity 62, as described above. The blood sample and the fluid buffer are drawn through the flow cavity 62 at a chosen flow rate. The flow rate may be chosen to mimic the flow rate experienced by platelets in an artery, where arterial shear rate is $1500 \text{ s}^{-1}$.

The blood sample flows over the second elongate surface 46 of the second outer layer 32. The test area 48 is provided on the second surface 46 of the second outer layer 32. The blood sample flows over the test area 48, and platelets in the blood sample interact with the vWF test material coated on the test area 48. The flow cavity 62 of the device 30 is dimensioned such that the blood sample will be subjected to a substantially constant shear force in the region of the test area 48. Interactions between the platelets and the test material can be inspected using a suitable detector such as an imaging device.

By using a fluid buffer in the device 30, the volume of fluid sample required is reduced. Further by using the bifurcated arrangement of the first and second paths of the flow cavity, the fluid sample may be directed unto the test surface and away from the sides of the flow cavity. Thus edge effects can be reduced, keeping the fluid sample flow well within the laminar region. Any mixing of the fluid buffer and the fluid sample is primarily diffusive in nature and, as such, mixing is considered negligible.

Figure 6:
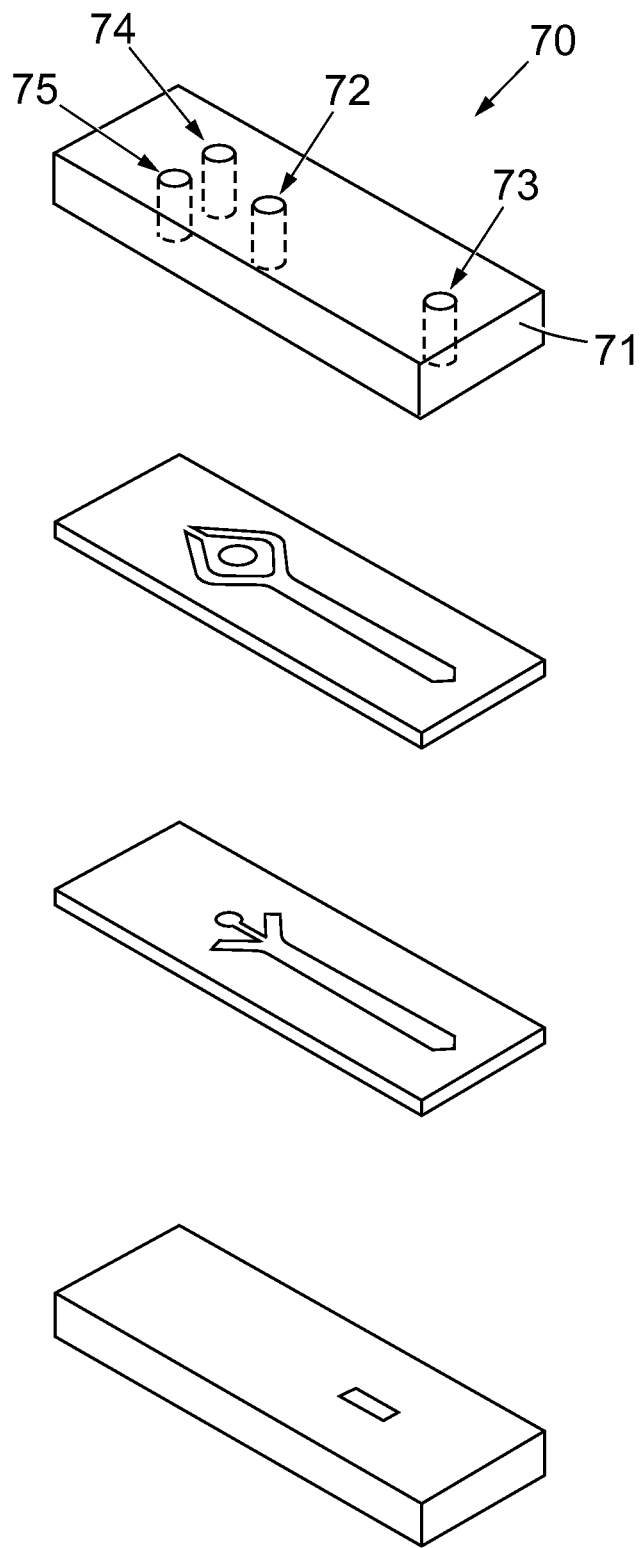
FIG. 6 is an exploded perspective view of a schematic representation of a third embodiment of the device of the present invention.

FIG. 6 shows a third embodiment of the device of invention. The device 70 comprises four layers, similar to those of FIG. 3. The first outer layer 71 provides a sample inlet 72, an outlet 73, a first buffer inlet 74 and a second buffer inlet 75. The first buffer inlet 74 connects to a first branch of the aperture defined in the first interposed layer of the device. The second buffer inlet 75 connects to a second branch of the aperture defined in the first interposed layer of the device.

Figure 7:
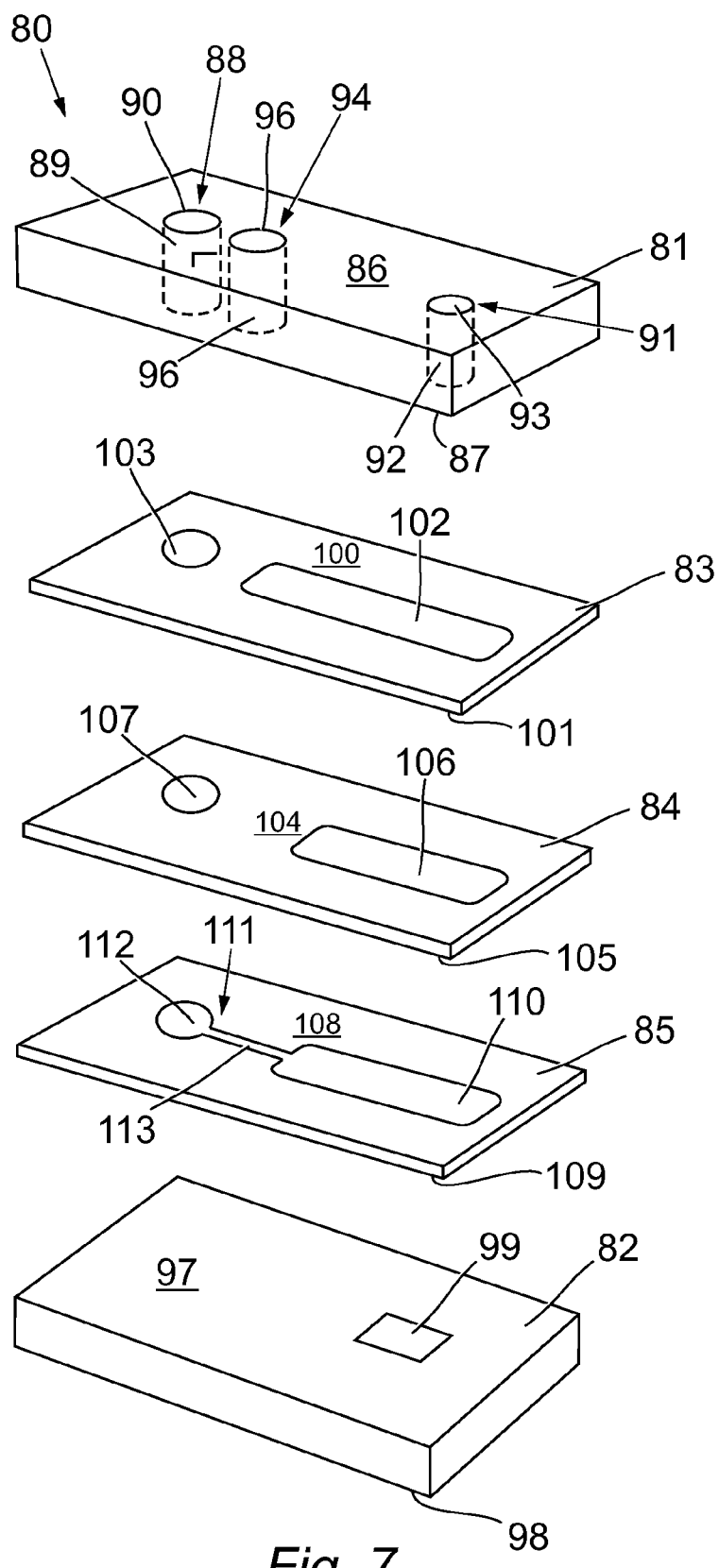
FIG. 7 is an exploded perspective view of a schematic representation of a fourth embodiment of the device of the present invention.

FIG. 7 show a fourth embodiment of a microfluidic device. The microfluidic device 80 is in the form of a planar platform, and comprises four layers, a first outer layer 81, a second outer layer 82, a first interposed layer 83, a second interposed layer 84 and a third interposed layer 85.

The first outer layer 81 of the device 80 comprises a first elongate surface 86 and a second elongate surface 87. The first outer layer 81 provides a sample inlet 88 of the device 80, comprising a sample inlet passage 89 and a sample inlet port 90. The sample inlet passage 89 passes through the first outer layer 81 from the first surface 86 of the layer to the second surface 87 of the layer. The sample inlet port 90 is defined by the sample inlet passage 89 in the first surface 86 of the first outer layer 81. The first outer layer 81 provides an outlet 91 of the device 80, comprising an outlet passage 92 and an outlet port 93. The outlet passage 92 passes through the first outer layer 81 from the first surface 86 of the layer to the second surface 87 of the layer. The outlet port 93 is defined by the outlet passage 92 in the first surface 86 of the first outer layer 81. The first outer layer 81 further provides a buffer inlet 94 of the device 80, comprising a buffer inlet passage 95 and a buffer inlet port 96. The buffer inlet passage 95 passes through the first outer layer 81 from the first surface 86 of the layer to the second surface 87 of the layer. The buffer inlet port 96 is defined by the buffer inlet passage 95 in the first surface 86 of the first outer layer 81.

The second outer layer 82 of the device 80 comprises a first elongate surface 97 and a second elongate surface 98. It will again be appreciated that the material of the second outer layer 82 can be selected from a range of materials, such as polymer or glass. The choice of material allows a user of the device the flexibility to develop custom chemistries for their specific application. The second outer layer 82 provides a test area 99 of the device 80, on the first surface 97 of the second outer layer. The test area 99 has at least one test material attached to it. The test material may be any suitable activating material, including but not limited to, platelet activating protein, such as von Willebrand Factor (vWF), vascular matrix collagens, catheter materials, stent materials, tissue factors and phospholipids, vascular endothelial cell and extracellular matrices, and sections of human artery plaque materials. The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area. When the objects are platelets, the test material can be:—annexin V, antiobjects specific for P-selectin, CD63, LAMP-1, LAMP-2, Na, fXa, vWF, 5-HT, thrombospondin, fibronectin, á2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

In the device 80 the second outer layer 82 provides a test area 99 which is coated with vWF test material. It will be appreciated that other test materials and fluid sample types can be used in the device.

The first interposed layer 83 of the device 80 comprises a first elongate surface 100 and a second elongate surface 101. The first interposed layer 83 is a pressure-sensitive adhesive (PSA) layer. The first interposed layer 83 defines an elongate aperture 102 through the layer 83 from the first surface 100 thereof to the second surface 101 thereof. The first interposed layer 83 further defines a substantially circular aperture 103 through the layer 83 from the first surface 100 thereof to the second surface 101 thereof.

The second interposed layer 84 of the device 80 comprises a first elongate surface 104 and a second elongate surface 105. The second interposed layer 84 is a pressure-sensitive adhesive (PSA) layer. The second interposed layer 84 defines an elongate aperture 106 through the layer 84 from the first surface 104 thereof to the second surface 105 thereof. The length of the elongate aperture 106 is less than the length of the elongate aperture 102 in the first interposed layer 83. The second interposed layer 84 further defines a substantially circular aperture 107 through the layer 84 from the first surface 104 thereof to the second surface 105 thereof.

The third interposed layer 85 of the device 80 comprises a first elongate surface 108 and a second elongate surface 109. The third interposed layer 85 is a pressure-sensitive adhesive (PSA) layer. The third interposed layer 85 defines an elongate aperture 110 through the layer 85 from the first surface 108 thereof to the second surface 109 thereof. The length of the elongate aperture 110 is substantially the same as the length of the elongate aperture 106 in the second interposed layer 84. The third interposed layer 85 further defines a composite aperture 111 through the layer 85 from the first surface 108 thereof to the second surface 109 thereof. The composite aperture 111 comprises a substantially circular aperture 112 connected to an extended aperture 113. The extended aperture 113 is connected to the elongate aperture 110 of the third interposed layer 85.

The device 80 is assembled by pressing the layers together. The second elongate surface 101 of the first interposed layer 83 is pressed onto the first elongate surface 104 of the second interposed layer 84. The first elongate surface 108 of the third interposed layer 85 is pressed onto the second elongate surface 105 of the second interposed layer 84. The second elongate surface 87 of the first outer layer 81 is pressed onto the first elongate surface 100 of the first interposed layer 83. The first elongate surface 97 of the second outer layer 82 is pressed onto the second elongate surface 109 of the third interposed layer 85. Preferably in use the device 80 is oriented such that the first outer layer 81 forms a top layer of the device 80, and the second outer layer 82 forms a base layer of the device 80.

As assembled, the second surface 87 of the first outer layer 81 abuts and substantially seals the elongate aperture 102 of the first interposed layer 83 along the first surface 100 of the first interposed layer 83. The first surface 97 of the second outer layer 82 abuts and substantially seals the elongate aperture 110 and the composite aperture 111 of the third interposed layer 85 along the second surface 108 of the third interposed layer 85. The elongate aperture 102 of the first interposed layer 83, the elongate aperture 106 of the second interposed layer 84 and the elongate aperture 110 of the third interposed layer 85 are substantially aligned. The substantially circular aperture 103 of the first interposed layer 83 meets and connects to the substantially circular aperture 107 of the second interposed layer 84, which in turn meets and connects to the circular aperture 112 of the composite aperture 111 of the third interposed layer 85.

The first and second outer layers 81, 82 and the first, second and third interposed layers 83, 84, 85 define a flow cavity 114 of the device 80. The first elongate surface 97 of the second outer layer 82 provides a first surface of the flow cavity 14, the second elongate surface 87 of the first outer layer 81 provides a second surface of the flow cavity 114, and internal surfaces of the apertures 102, 106, 110 of the first, second and third interposed layer 83, 84, 85 provide edge surfaces of the flow cavity 114. The flow cavity thus comprises a first path 115 substantially bounded by the first elongate surface 97 of the second outer layer 82 and the internal surface of the aperture 110 of the third interposed layer 85, and a second path 116 substantially bounded by the second elongate surface 87 of the first outer layer 81, the internal surface of the aperture 102 of the first interposed layer 83 and the internal surface of the aperture 106 of the second interposed layer 84. The flow cavity 114 has a height equal to the thickness of the first, second and third interposed layers 83, 84, 85. The flow cavity 114 has an aspect ratio which is adapted to provide a substantially constant shear force between the test area 99 and fluid sample flowing over the test area 99, for example, the flow cavity 114 may have a height of approximately 50 µm and a width of approximately 2 mm. The flow cavity 114 is largely sealed from the external environment around the device 80.

The sample inlet passage 89 in the first outer layer 81 meets and connects to the aperture 103 of the first interposed layer 83, which in turn meets and connects to the aperture 107 of the second interposed layer 84, which in turn meets and connects to the aperture 112 of the third interposed layer 85, which in turn meets the first elongate surface 97 of the second outer layer 82. A sample channel is thus formed from the sample inlet port 89 of the first outer layer 81 to the first elongate surface 97 of the second outer layer 82. Fluid sample introduced into the device 80 via the sample inlet port 90 flows along the sample channel into the extended aperture 113 of the third interposed layer 85, and from there into the first path 115 of the flow cavity 114 of the device 80.

The outlet passage 92 in the first outer layer 81 meets and connects to an end of the aperture 102 of the first interposed layer 83. As the aperture 102 of the first interposed layer 83 and the apertures 106, 110 of the second and third interposed layers 84, 85 are aligned, an outlet channel is formed from the aperture 110 of the third interposed layer 85, through the aperture 106 of the second interposed layer 84, through the aperture 102 of the first interposed layer 83 to the outlet passage 92. Fluid flowing in the first path 115 of the flow cavity 114 of the device 80 and fluid flowing in the second path 116 of the flow cavity 114 of the device 80 flows from the flow cavity 1114 into the outlet channel and exits the device 80 via the outlet port 93.

The buffer inlet passage 95 in the first outer layer 81 meets and connects to an end of the elongate aperture 102 of the first interposed layer 83, the aperture 102 of the first interposed layer 83 meets and connects with the aperture 106 of the second interposed layer 84, and the aperture 106 of the second interposed layer 84 meets and connects to the aperture 110 of the third interposed layer 85. Fluid buffer introduced into the device 80 via the buffer inlet port 96 flows along the buffer inlet passage 95 and into the aperture 102 of the first interposed layer 83, i.e. into a portion of the second path 116 of the flow cavity 114. Fluid buffer further flows along the aperture 102 of the first interposed layer 83 and into the aperture 106 of the second interposed layer 85 and the aperture 110 of the third interposed layer 85, i.e. flows into a further portion of the second path 116 of the flow cavity 114 and into the first path 115 of the flow cavity 114.

The first and second paths 115, 116 of the flow cavity 114 of the device 80 are arranged such that flow of the fluid buffer therein shapes flow of the fluid sample therein to direct the fluid sample towards and onto the first surface 97 of the second outer layer 82, where the test area 99 is situated, and away from edge surfaces of the flow cavity 114. The first path 115 of the flow cavity 114 is formed from the first surface 97 of the second outer layer 82 and the internal surface of the elongate aperture 110 of the third interposed layer 85, and has a height d which is the thickness of the third interposed layer 85. The second path 116 of the flow cavity 114 is formed from the second surface 87 of the first outer layer 81 and the internal surface of the elongate aperture 102 of the first interposed layer 83, and the internal surface of the elongate aperture 106 of the second interposed layer 84, and has a height d which is the thickness of the first and second interposed layers 83, 84.

Fluid sample enters the extended aperture 113 of the third interposed layer 85 and flows from there into the aperture 110, i.e. the first path 115 of the flow cavity 114. The width of the extended aperture 113 of the third interposed layer 82 is less than the width of the aperture 110, and the extended aperture 113 is connected to a central portion of the first path 115 of the flow cavity 114, and the fluid sample flows at least substantially into the central portion of the first path 115 of the flow cavity 114. Fluid buffer enters the aperture 102 of the first interposed layer 81 and flows along a portion of the second path 116 of the flow cavity 114 defined by this aperture. At the point where the aperture 102 of the first interposed layer 81 meets and connects to the apertures 106 and 110 of the second and third interposed layers 84, 85, the fluid buffer continues at least in part to flow along the portion of the second path 116 of the flow cavity 114 defined by the aperture 102, but also flows into and along a portion of the second path 116 of the flow cavity 114 defined by the aperture 106 of the second interposed layer 84, and flows into and along a portion of the first path 115 of the flow cavity 114. At a point where the apertures 102, 106, 110 all meet, the extended aperture 113 connects to the central portion of the first path 115 of the flow cavity 114. The fluid sample is flowing into the central portion of the first path 115 of the flow cavity 114, and the fluid buffer will therefore flow into side portions of the first path 115 of the flow cavity 114. The fluid sample will flow along the central portion of the first path 115 of the flow cavity 114. Thus arrangement of the paths of the flow cavity results in the fluid buffer surrounding the fluid sample on three sides, and shaping the flow of the fluid sample to direct the fluid sample towards and onto the first surface 97 of the second outer layer 82, where the test area 99 is situated, and away from edge surfaces of the first path 115 of the flow cavity 114.

In use, a user introduces a fluid sample into the device 80. In this embodiment, the fluid sample comprises a blood sample and objects in the fluid sample are blood platelets; interaction of platelets in the blood sample with the vWF test material are of interest. The blood sample is introduced into the sample inlet 88 through the sample inlet port 90 and from there into the sample inlet passage 88. The blood sample flows from the sample inlet passage 89 into the flow cavity 114. The blood sample flows over the second elongate surface 97 of the second outer layer 82. The test area 99 is provided on the second surface 97 of the second outer layer 82. The blood sample flows over the test area, and platelets in the blood sample interact with the vWF test material coated on the test area 99. The flow cavity 114 is dimensioned such that the blood sample will be subjected to a substantially constant shear force in the region of the test area 99. Interactions between the platelets and the test material can be inspected using a suitable detector.

In each of the devices described above, deposition of the test material, for example protein coating, on the test area may be carried out using any suitable technique, for example coating through adsorption or matrix deposition by micropatterning. The principle advantages of micropatterning include controlled deposition (uniform coverage) of the area, reduced cost, reproducibility, facilitation of data analysis and interpretation and multi-matrix deposition.

Each of the microfluidic devices described above provide a controlled environment in which hydrodynamic shear force mediated interactions of objects such as cells with a test material can be studied. Interactions between a range of cellular species and test material types may be analysed using the microfluidic devices. The cellular species may be selected from, but are not limited to, platelets, leukocytes and tumour cells.

The devices of the present invention combine the advantages of a parallel plate flow chamber and the advantages of a flow cytometer in order to provide a uniform shear over the test area while minimising the overall fluid sample usage. The flow cavity of the devices of the present invention cause the fluid samples to contact the test area over a range of shears. The flow of the sample fluid is shaped to ensure it contacts the test material of the test area, by controlling and/or constraining the degrees of freedom of movement of the fluid sample.

In particular, it can be considered that the fluid sample has the potential to move through six degrees of freedom, back or forth—along the length of the flow cavity, left or right—across the width of the flow cavity, and up or down—top or bottom of the flow cavity. Back or forth movement of the fluid sample is controlled by fluid sample delivery means, for example by a pump such that the fluid sample flows through the flow cavity from an inlet to an outlet. Fluid buffer, located on the left and right of the fluid sample, and the internal walls of the flow cavity control left or right movement of the fluid sample, for example bifurcation of the fluid buffer comes from both left and right. Upwards movement of the fluid sample can be constrained by the fluid buffer and/or internal walls of the flow cavity. Thus, the sample fluid can only move down and along the length of the flow cavity ensuring contact of the fluid sample with the test area.

Figure 8:
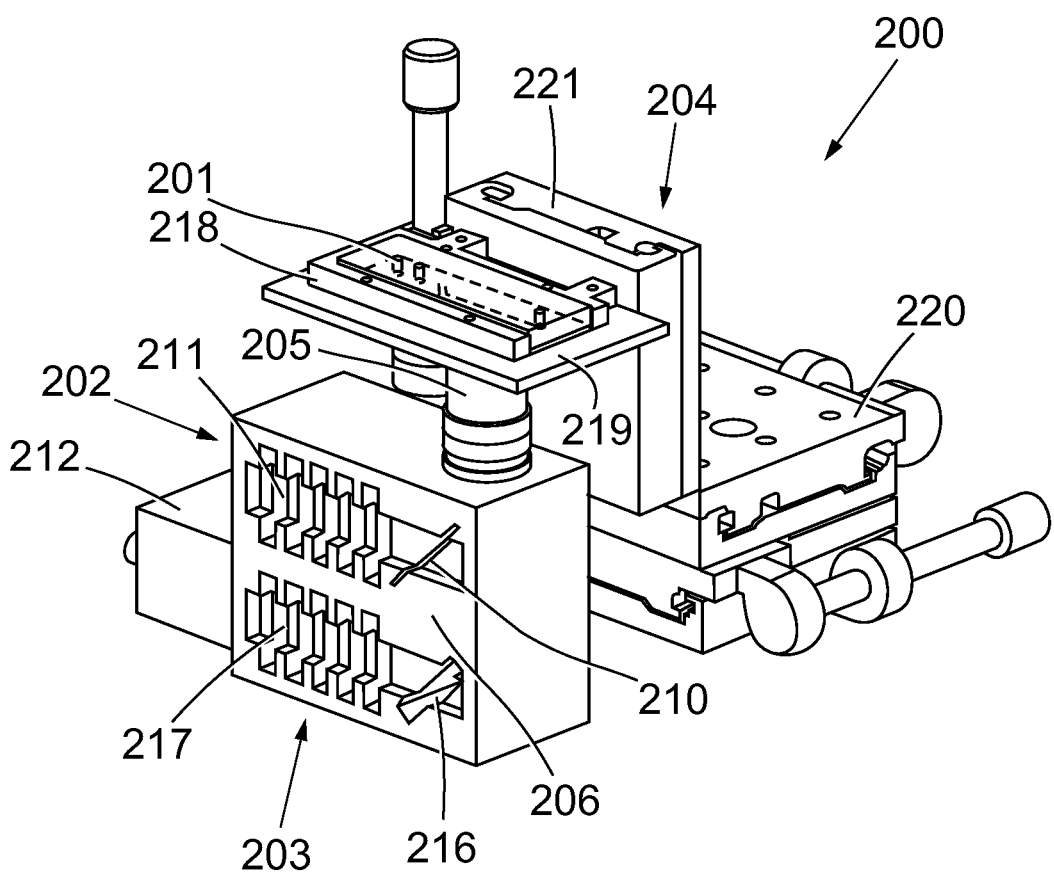
FIG. 8 is a perspective view of a schematic representation of an embodiment of the system of the second aspect of the invention.
Figure 9:
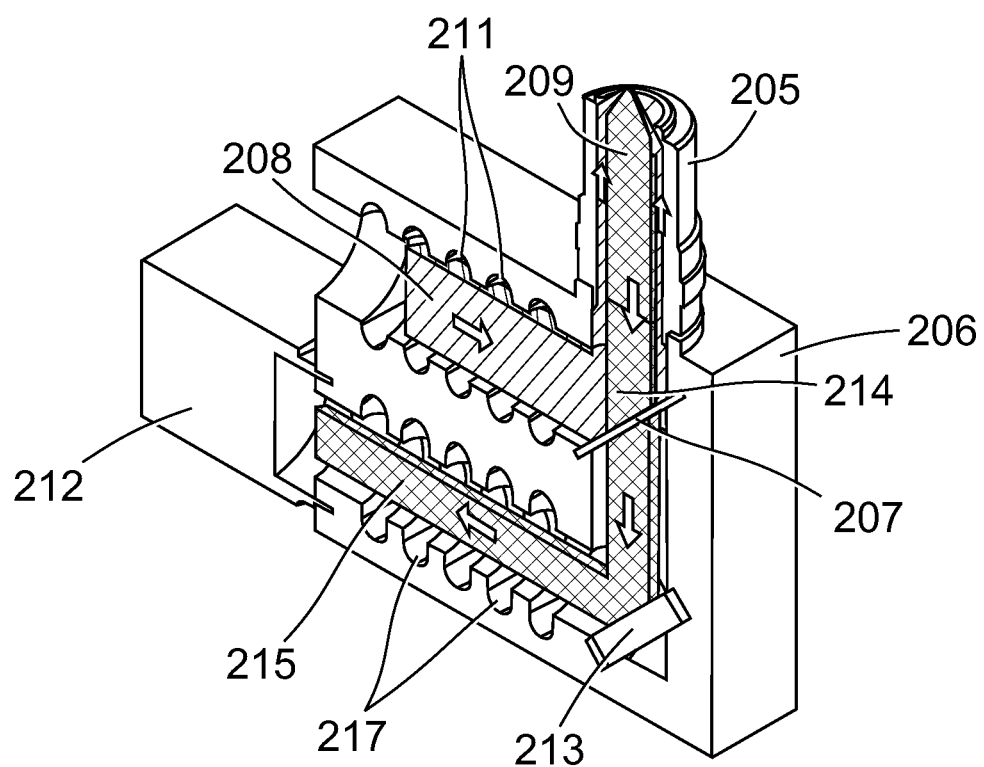
FIG. 9 is a sectional view of part of the system of FIG. 8.

FIGS. 8 and 9 show an embodiment of an object/test material interaction system of the second aspect of the invention. The object/test material interaction system 200 of this embodiment comprises a device 201 and a Zeiss Axiovert-200 epi-fluorescent microscope, which comprises an excitation apparatus 202 for exciting interactions, a detection apparatus 203 for detecting interactions, and a positioning apparatus 204 for positioning the device 201 relative to the excitation apparatus 202 and the detection apparatus 203.

The device 201 may be any of the embodiments of devices described above.

The excitation apparatus 202 comprises an excitation radiation source, comprising a low cost, high brightness, blue-light emitting diode (LED), not shown. High brightness LEDs may be used as an excitation source to reduce the expense and power consumption of typical laser excitation systems. LEDs are low cost and come in a range of colours and therefore excitation wavelengths. The excitation apparatus 202 further comprises an objective lens 205, and an optics housing 206 between the LED and the lens 205. The optics housing 206 contains a dichroic mirror 207, and defines a first excitation path 208 from the LED to the mirror 207, and a second excitation path 209 from the mirror 207 to the objective lens 205. Use of the mirror 207 allows the excitation path from the LED to the lens 205 to be folded. The optics housing is provided with a diagonal slot 210, which receives the mirror 207. The diagonal slot 210 is accessible from an outer surface of the optics housing 206, thereby allowing a user to easily change the mirror 207 of the excitation apparatus 202. The optics housing 206 is further provided with a plurality of vertical slots 211, which receive excitation filters (not shown). The slots 211 are accessible from an outer surface of the housing 206, thereby allowing a user to easily change the excitation filters and the positions of the excitation filters from the LED to the mirror 207. This allows the user to vary the excitation path length. Facilitating the change of filters using a slot system rather than a rotary turret allows both a reduction in overall size and allows the user to easily combine filter sets in order to optimise the signal for a particular application.

The detection apparatus 203 comprises a CCD camera 212, the objective lens 205, and the optics housing 206 between the camera 212 and the lens 205. The camera 212 comprises a liquid-chilled Quantix-57 CCD camera (Photometrics Ltd, AZ, USA) having an image capture rate of 24 frames per second; a viewing region of 267×256 pixels (52.5×54.9 µm); and an exposure time of 40 ms. The optics housing 206 contains a mirror 213, and defines a first emission path 214 from the objective lens 205 to the mirror 213, and a second emission path 215 from the mirror 213 to the camera 212. Use of the mirror 213 allows the emission path from the lens 205 to the camera 212 to be folded, while maintaining the required distance between the objective lens 205 and an imaging plane of the camera 212. The optics housing 206 is provided with a diagonal slot 216, which receives the mirror 213. The diagonal slot 216 is accessible from an outer surface of the housing 206, thereby allowing a user to easily change the mirror 213 of the detection apparatus 203. The optics housing 206 is further provided with a plurality of vertical slots 217, which receive emission filters (not shown). The slots 217 are accessible from an outer surface of the housing 206, thereby allowing a user to easily change the emission filters and the positions of the emission filters from the mirror 213 to the camera 212. This allows the user to vary the emission path length. Facilitating the change of filters using a slot system rather than a rotary turret allows both a reduction in overall size and allows the user to easily combine filter sets in order to optimise the signal for a particular application.

The positioning apparatus 204 comprises a holder 218, a platform 219, a horizontal translation stage 220, and a vertical translation stage 221. The holder 218 holds the device 201. In this embodiment, the holder 218 is dimensioned to hold a device of dimensions similar to those of a standard microscope slide. The holder 218 holds the device 201 on the platform 219. The platform 219 comprises two heaters in the form of two heating coils 222 located on the underside of the platform. The heater coils allow variations in the temperature of the holder 218 and the device 201 to be achieved, and in turn to ensure experiments are carried out at a desired temperature. The ability to thermally control the temperature of the holder 118 and therefore the device 201 provides an advantage over many systems, which tend to enclose the microscope in an environmental chamber adding significantly to the overall system size. The platform 219 is connected to the translation stages 220, 221. The horizontal translation stage 220 is configured to give motion in two orthogonal horizontal dimensions, and therefore the platform 219 and the device 201 may be moved in the two orthogonal horizontal dimensions, for adjustment of the positioning between the device 201 and the excitation and emission apparatus 202, 203. The vertical translation stage 221 is configured to give motion in a vertical dimension, orthogonal to the two horizontal dimensions of the stage 220, and therefore the platform 219 and the device 201 may be moved in the vertical dimension, for adjustment of the positioning between the device 201 and the excitation and emission apparatus 202, 203.

Software may be integrated within the system to allow control of the various parts of system, for example temperature control of the platform, pump control of injection of fluid into the device, calculations of flow rate within the device, control of the camera configuration such as capture parameters, and image processing. Each of these control areas have been modularised and can be used independent of, or in conjunction with, a main control.

In use, a device 201 is positioned in the holder 218 on the platform 219 of the positioning apparatus 201. The stages 220, 221 are adjusted to place the device 210 in a suitable position relative to the excitation and emission apparatus 202, 203. A fluorescently-stained fluid sample is passed through the microfluidic device 201 under controlled shear. Objects of the fluid sample interact with the test material of the test area of the device 210. Light from the LED is emitted along the first excitation path 208, impinges the mirror 207 and is reflected along the second excitation path 209 into the objective lens 205. The lens 205 focuses the light onto the objects of the fluid sample which are excited by the light and emit fluorescent signals. The fluorescent signals enter the objective lens and are focussed along the first emission path 214, impinge on the mirror 213 and are reflected along the second emission path 215 into the camera 212. The fluorescent signals from the objects in the fluid sample are captured by the camera 212, in the form of fluorescent images (video frames). The images are captured over user-defined ranges of time and frame rates, which will depend on the interactions of interest.

Figure 10:
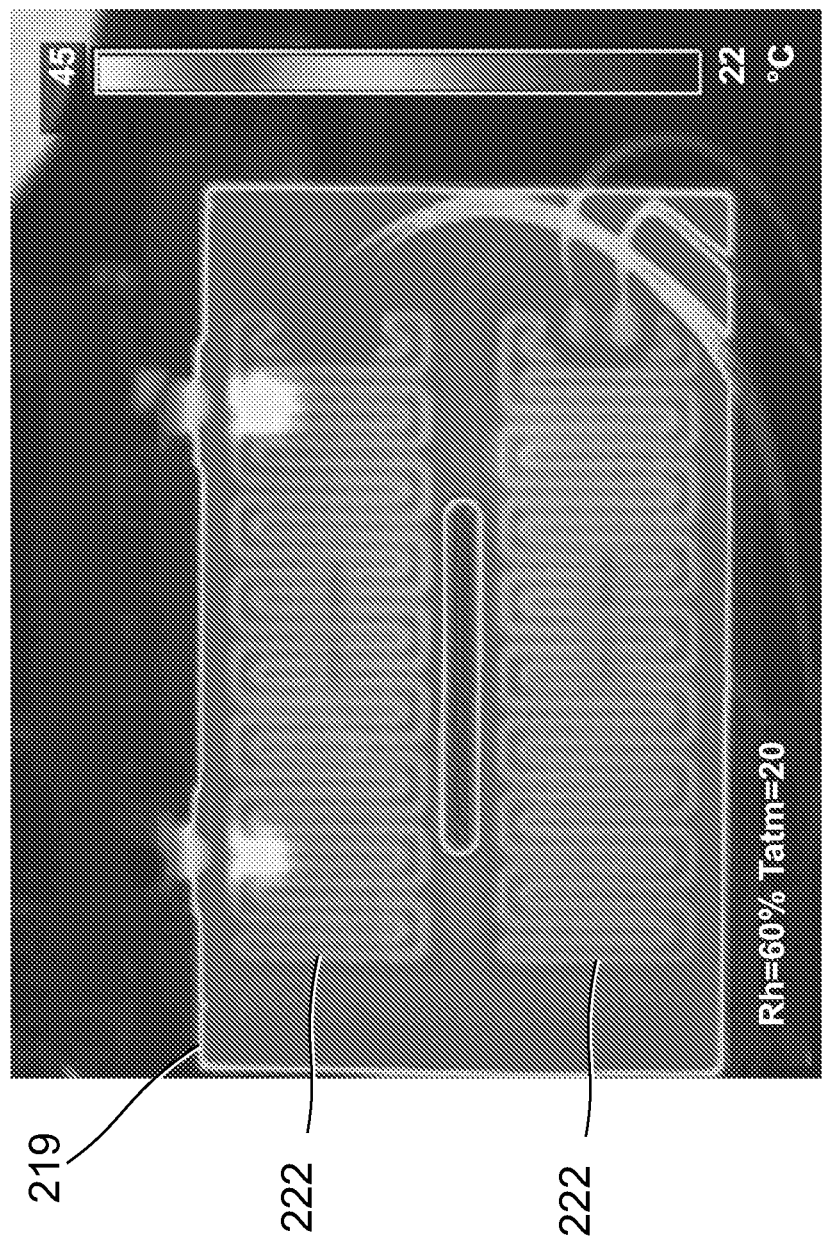
FIG. 10 is a plan view of a platform of the system of FIG. 8.
Figure 11:
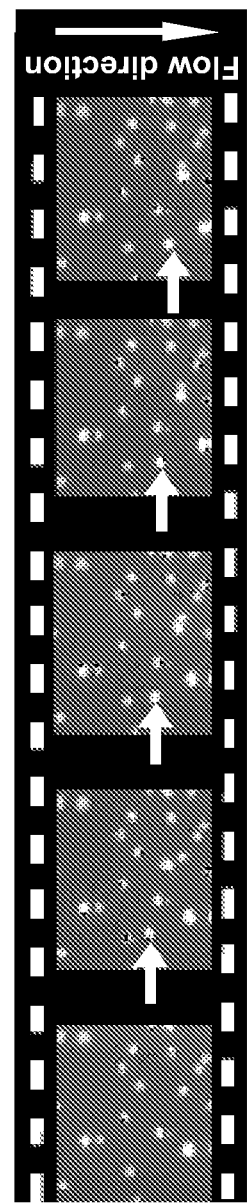
FIG. 11 shows images captured by the system of FIG. 8.
Figure 12:
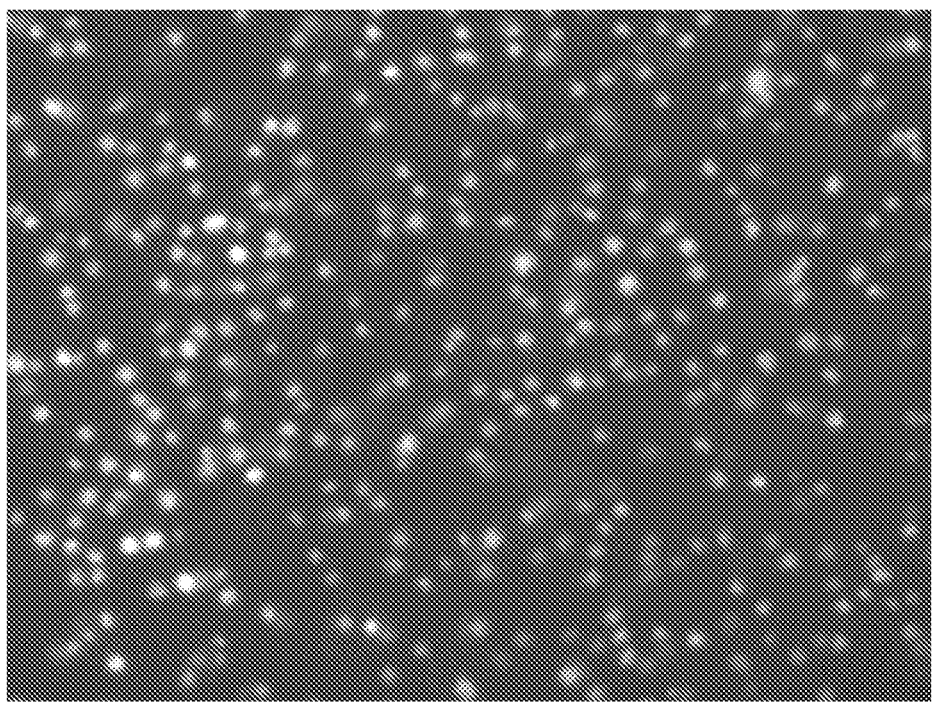
FIG. 12 shows an image of fluorescent platelets captured by the system of FIG. 8.

FIG. 10 depicts a time series showing raw data in the form of a series of fluorescent images (video frames) of fluorescent signals from the objects in the fluid sample. White arrows indicate the initial appearance of an object in the second image and its slow motion in the downward direction of flow of the fluid sample.

The system of the present invention advantageously increases the speed and reduces the cost of performing bright field or fluorescent microscopy under either static or flow conditions. The microscope itself, coupled with the thermally controlled stage, facilitates the suitability of the device for use with biological samples.

The device of the present invention can be used to measure each of the steps involved in the development and dissolution of a thrombus, including (i) initial platelet adhesion; (ii) platelet translocation velocity and arrest; (iii) platelet morphology (platelet protrusions, blebs, filipodia, etc.); (iv) platelet translocation, rotational movements, side to side flipping mechanism; (v) sliding platelets; (vi) platelet detachment; (vii) thrombus stability (activated and inhibited fibrinolysis); (viii) measurement of single platelet-matrix interactions (satellite platelets) and platelet aggregates (interacting platelets, platelet micro-aggregates and macro-aggregates) on matrix surfaces—this could be an indicator of defective platelet-cross talk (platelet dysfunction and defective platelet-receptor interactions); and (ix) measurement of % surface area of coverage. The device of the present invention can also measure total fluorescence during formation of a clot and further may be used in the analysis of downstream events, and length of time a platelet remains at the same location (i.e. amount of time platelet is stationary).

In cardiovascular applications, the device of the present invention may be used to measure changes to haemostatic mechanisms caused by the disease and/or drugs. For example, the device of the present invention may be used to measure platelet dysfunction and receptor abnormality, monitor platelet-mediated thrombus formation, monitor coagulation-mediated thrombus formation, measure sensitivity to drug therapy (anti-thrombotics and prohaemostatics), measure intra- and inter-individual variability, investigate novel therapeutics strategies, validate effects of drugs on haemostasis and elucidate the mechanisms of bleeding disorders, e.g. Von Willebrand Disease. The device may be used in any applications involving measurement of platelet function under conditions of venous, arterial and pathological vascular fluid shear and stenosis.

The device of the present invention may also be used to measure changes to haemostatic mechanisms of patients with diabetes mellitus. The majority of patients with diabetes mellitus die from vascular complications, such as acute thrombotic events. Increasing evidence demonstrates the presence of platelet emboli and platelet hyper-reactivity in patients with diabetes mellitus and the patho-physiological contributions of platelets to diabetic vascular disease.

The device of the present invention may also be used as a tool for research and diagnostics. For example, the device may be used to investigate leukocyte recruitment, adhesion and migration on matrices and human vascular endothelial cell layers and the role of platelets in inflammatory-mediated processes. The investigation of platelet-leukocyte interactions may provide an indication of inflammatory and cardiovascular-mediated events.

A further application of the device of the present invention is in the area of cancer-tumour growth and metastasis where the device may play a role in analysing the influence of vascular pathways on metastatic cell spread. In particular, the device may be used to investigate dissemination of tumour cells, influence of the vasculature and fluid shear on metastatic-cell aggression, extravasion from the vasculature and metastasis and the role of platelets in cancer cell progression and metastasis.

The device of the present invention may be used in analysing platelet function in newborns and children. Studies of neonatal platelets have been hampered in the past by the difficulty in obtaining adequate blood samples and meeting sample volume requirements. The device of the present invention may assist in carrying out studies on the physiological differences between neonatal platelets and those of children and adults, platelet dysfunction and the effect of drugs on neonatal platelet function.

In addition to the uses outlined above, the device of the present invention may be used in any application wherein cell function and/or interaction of cells with a surface is being analysed. For example, the device may be used to analyse the interaction of platelets with materials used in implants such as catheters, stents; particularly those with bifurcations.

Examples of uses of the present invention are now provided for illustrative purposes.

Example 1

Measurement of Platelet Function on Matrix Protein Von Willebrand Factor and Assessment of Treated Versus Non-Treated Blood Samples The microfluidic device was used to measure the shear-activated response of platelets in the presence of von Willebrand Factor (vWF). In particular, the effect of platelet specific GPIIb-IIIa antagonist (abciximab, ReoPro) on platelet function was examined. Abciximab (trade name ReoPro, distributed by Eli Lilly) is a platelet aggregation inhibitor used mainly during and after coronary artery procedures to prevent platelets from sticking together, by platelet GPIIb-IIIa-mediated aggregation, and subsequent thrombus formation.

Method

Blood Draw: Blood was obtained from volunteers by venopuncture using a 19-g needle attached to a polypropylene syringe containing anticoagulant solution. Following blood draw, the blood was transferred to sterile polypropylene tubes and kept at 37° C. Suitable anticoagulants used included Direct Thrombin Inhibitors: PPACK (100 μM) or recombinant hirudin. Cation chelating solutions; Sodium Citrate 3.2% stock solutions; final w/v concentrations 0.32%; 1 part anticoagulant to 9 parts blood.

Labelling of blood for perfusion assays: Platelets were fluorescently labelled in whole blood using a lipophilic carbocyanine dye, 3, 3'-dihexyloxacarbocyanine iodide (DiOC6; Molecular Probes, Invitrogen). Platelet loading with DiOC6 was relatively straightforward and involved incubation of the blood with 1 μM DiOC6 for 10 minutes at 37° C. prior to perfusion. The significant reduction in blood volume used facilitates alternative options for blood draw and labelling procedures.

Matrix deposition on microfluidic device: The components of the flow cells were assembled using a jig to ensure patterned psa layers are aligned. Polypropylene luer connectors were placed at inlet/outlet points. Using silastic laboratory tubing, von Willebrand Factor solution (~100 ug/ml protein solution in Phosphate Buffered Saline solution (PBS) was injected to fill the flow cell. The platform was then left to sit for 2 hours to immobilise the vWF on the glass base. (The flow cells were blocked with 1% BSA solution (in PBS) for 1 hour at room temperature). Deposition of von Willebrand Factor was by coating through adsorption. The platforms were rinsed with PBS solution and were then ready for perfusion assays.

Blood perfusion protocol through the dual channel device for ReoPro studies: Whole blood was treated with ReoPro at a final concentration of 20 μg/ml for 20 minutes prior to perfusion assays. During this incubation period, platelets were also labelled with the lipophilic dye (DiOC$_6$) for 10 minutes, prior to flow. Untreated or treated labelled whole blood samples were perfused through the device as follows. A negative pressure was applied to the outlet creating suction on both buffer and sample reservoirs.

A positive pressure was applied to the buffer inlet. This positive pressure was a fraction of the pressure applied to the outlet in terms of its absolute value. This mismatch in pressures was compensated for by the sample flow. In practical terms, the suction on the outlet is calculated based on chamber dimensions and shear rate required. This value allows the user to calculate a flow rate for the buffer inlet that will allow sample flow through the device. This positive buffer pressure can be applied in a number of ways. However, for characterisation a second pump was used to maximise resolution. The imaging detection device or microscope was focussed over the flowing sample and images of particle interaction with the surface were captured. These images were then analysed using platelet tracking software, as described below in detail in Example 3.

Image acquisition: The MACRO imaging system used was Zeiss Axiovert 200 epi-fluorescence microscope with liquid chilled digital imaging camera, Quantix 57 CCD. The image acquisition software was MetaMorph (Universal Imaging).

Shear rates applied: The current shear rate routinely applied an arterial shear rate of $1500^{s-1}$. However, application of venous, arterial and patho-physiological shear rates or amendment of shear rates may apply with the current matrix being used and also when alternative matrices are being used (e.g. collagen matrices).

Results

Figure 13:
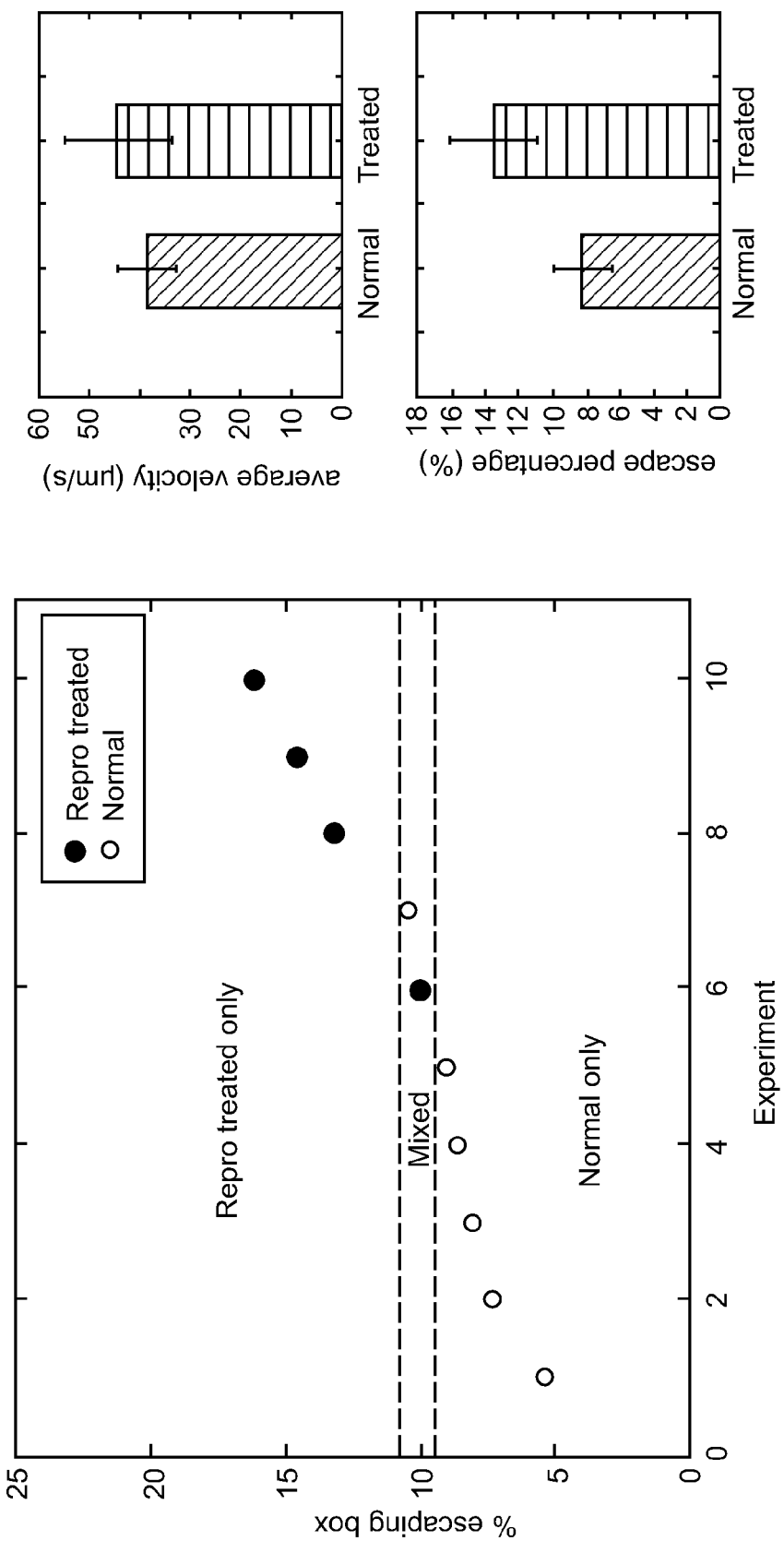
FIG. 13 is a graph showing the effect of platelet specific GPIIb-IIIa antagonist (abciximab, ReoPro) on platelet function as analysed using the device and system of the present invention.

In the presence of vWF, platelets were observed to translocate along the surface. Using platelet tracking software, as described in Example 3, it was shown that the average velocity (μm/s) and escape percentage was increased for Reopro treated platelets when compared to normal untreated platelets (FIG. 13).

Example 2

Protein Deposition by Ellipsometry

Ellipsometry has been widely used for the study of organic thin film formation and protein adsorption on surfaces. The rate of adsorption of a protein to a solid surface is determined by the concentration of protein in solution, the molecular dimensions of the protein and the properties of the substrate. In order to determine the reproducibility of the coating methodology for producing a coating of von Willenbrand factor (vWF) on glass, an ellipsometry study was conducted. The adsorption of vWF protein on silicon at the air/solid interface after drying the surface was experimentally determined. The relation between the concentration of vWF in solution and the adsorption rate was then evaluated.

Method

Substrate preparation: For the ellipsometry measurements, silicon wafers (a silicon/silicon dioxide ($Si/SiO_2$) substrate) were used as substrates. Due to the high refractive index of silicon, measurements on these substrates are more precise than measurements on glass. Nevertheless silicon wafers and glass have a similar chemical composition and reactivity properties and silicon wafers can therefore be used as a model for glass surfaces (the biggest difference between silicon and glass is that the roughness is higher in the case of glass. Four-inch polished, 100-cut, p-doped silicon wafers were cut into approximately 2×2 cm samples. All substrates were rinsed with MilliQ water and dried with $N_2$ before being used.

von Willenbrand factor protein surface preparation: Aqueous solutions of vWF in phosphate-buffered saline (PBS, pH 7.4) at concentrations ranging from 1 to 1000 μg/mL were prepared. Before adsorption experiments, the protein solutions were kept in a water bath at 37° C. 100 μL of each vWF solution was dropped on the centre of different samples and allowed to react for 2 hours. Each sample was subsequently rinsed with PBS, followed by rinsing with MilliQ water to remove the PBS salts on the surface. Afterwards, the substrates were dried with a stream of $N_2$ and the ellipsometric thickness was measured. All the surfaces were prepared at least two times.

Figure 14:
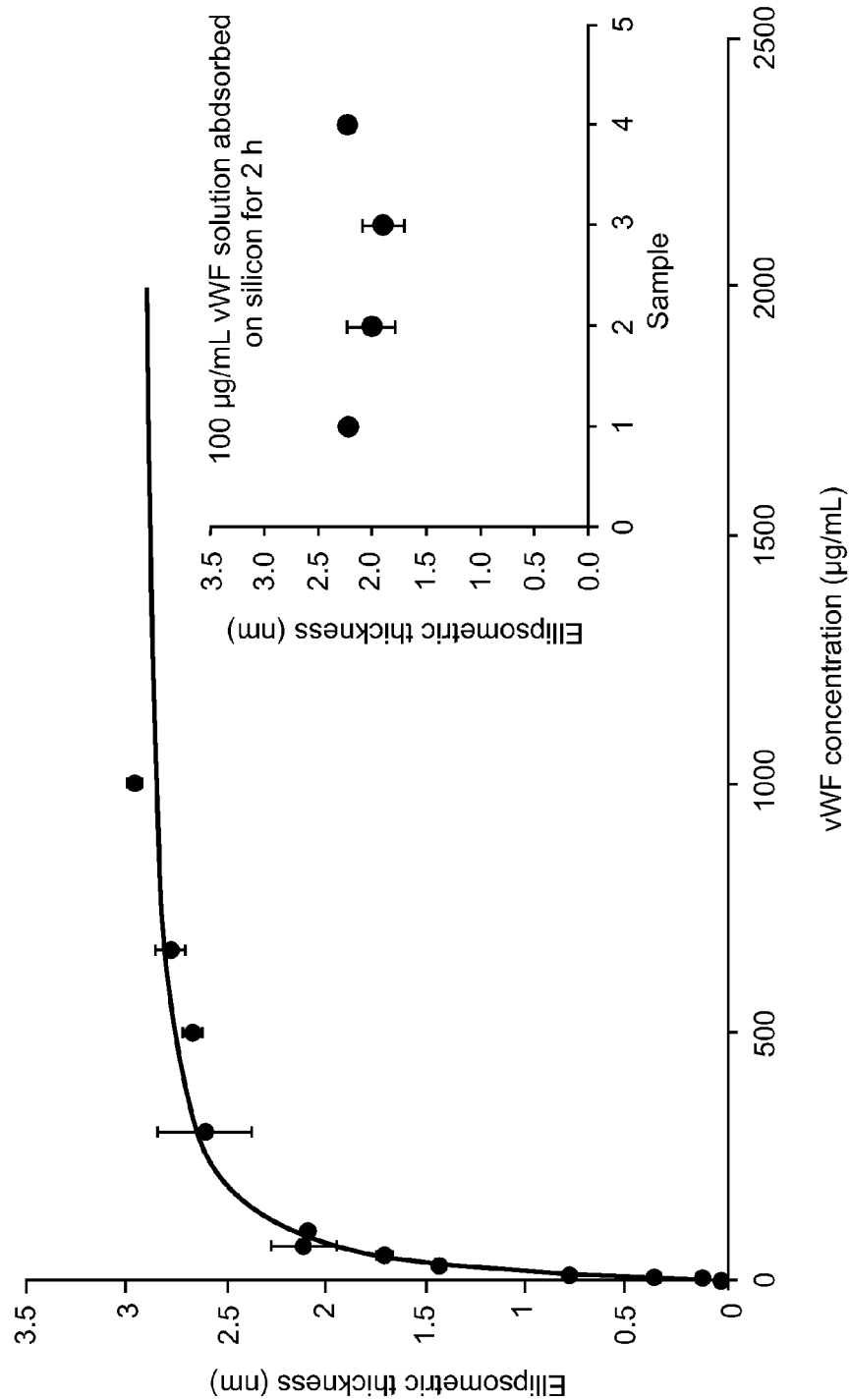
FIG. 14 is a graph showing the relationship between ellipsometric thickness of vWF protein layers on silicon wafers and concentration of vWF used in the production of the layers and the inset shows ellipsometric thickness measured in four different samples where a 100 mg/mL solution of vWF was absorbed—the plotted values are the average of nine points measured on each sample along an area of 1 $cm^2$.
Figure 15:
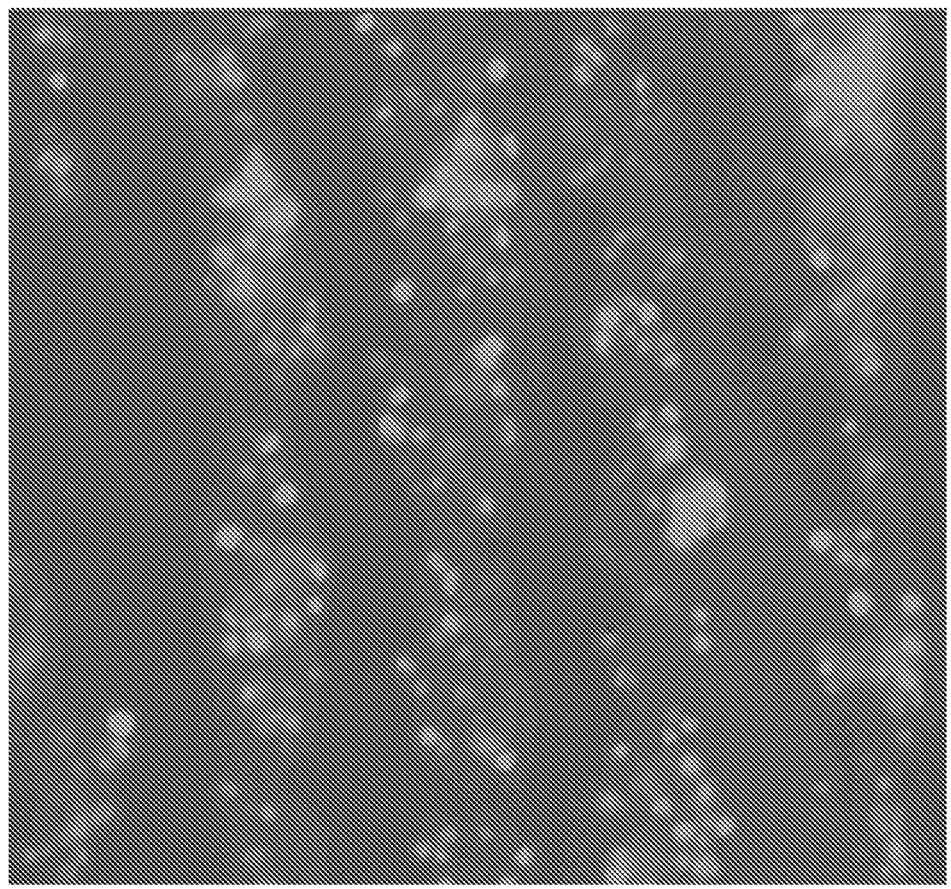
FIG. 15 shows an image of fluorescently labelled platelets rolling over a micropatterned matrix of vWF, the pattern is comprised by 15 mm lines of vWF separated by 15 mm.

Ellipsometry: Layer thicknesses were evaluated with a DeltaPsi2 spectroscopic Ellipsometer at λ=630, 635 and 640 nm, with incident angle of 75°. To calculate the ellipsometric thickness of the vWF layer, a two layers model, $SiO_2$, vWF, was used. The refractive index of vWF layer was assumed to be the same as the refractive index of $SiO_2$. The spot size of the incident light on the substrate was 5 by 1.5 $mm^2$ Results The results obtained are shown in FIG. 14. Increasing concentration of the protein in solution was shown to result in a higher ellipsometric thickness of the protein thin film.

The vWF adsorption isotherm curve is a Langmuir-type isotherm expressed by equation (1) as shown below:

$$\theta = \frac{KC}{(1 + KC)} \tag{1}$$

where θ represents the surface coverage ($mg/cm^2$), K represents the adsorption rate constant and C represents the concentration of the protein solution.

The surface coverage and the ellipsometric thickness are related by the equation (2) as shown below:

$$\theta = h\rho \tag{2}$$

where h (nm) is the ellipsometric thickness and p ($g/cm^3$) is the protein density.

The reproducibility of the coating was evaluated measuring two or more sets of samples. For samples made with vWF solutions of 100 μg/mL or higher concentrations, only a 3% variation in the ellipsometric thickness of several samples was observed. For coatings made with vWF solution of concentration from 10 to 70 μg/mL, the average deviation of the thickness between two samples was less than 16%.

To assure homogeneity in big areas of a sample, nine points were measured along an area of 1 $cm^2$. Samples made with vWF solution of 100 μg/mL were used (see FIG. 14). The results showed variations of the thickness in a single sample of less than 8% confirming the homogeneity of the coating along the sample. In view of these data, it is concluded that vWF protein adsorbs to the substrates in a reproducible manner.

The trajectories of objects in fluid samples can be determined to obtain information concerning interactions of the objects with a test material of a test area of the device of the first aspect of the invention.

Figure 16:
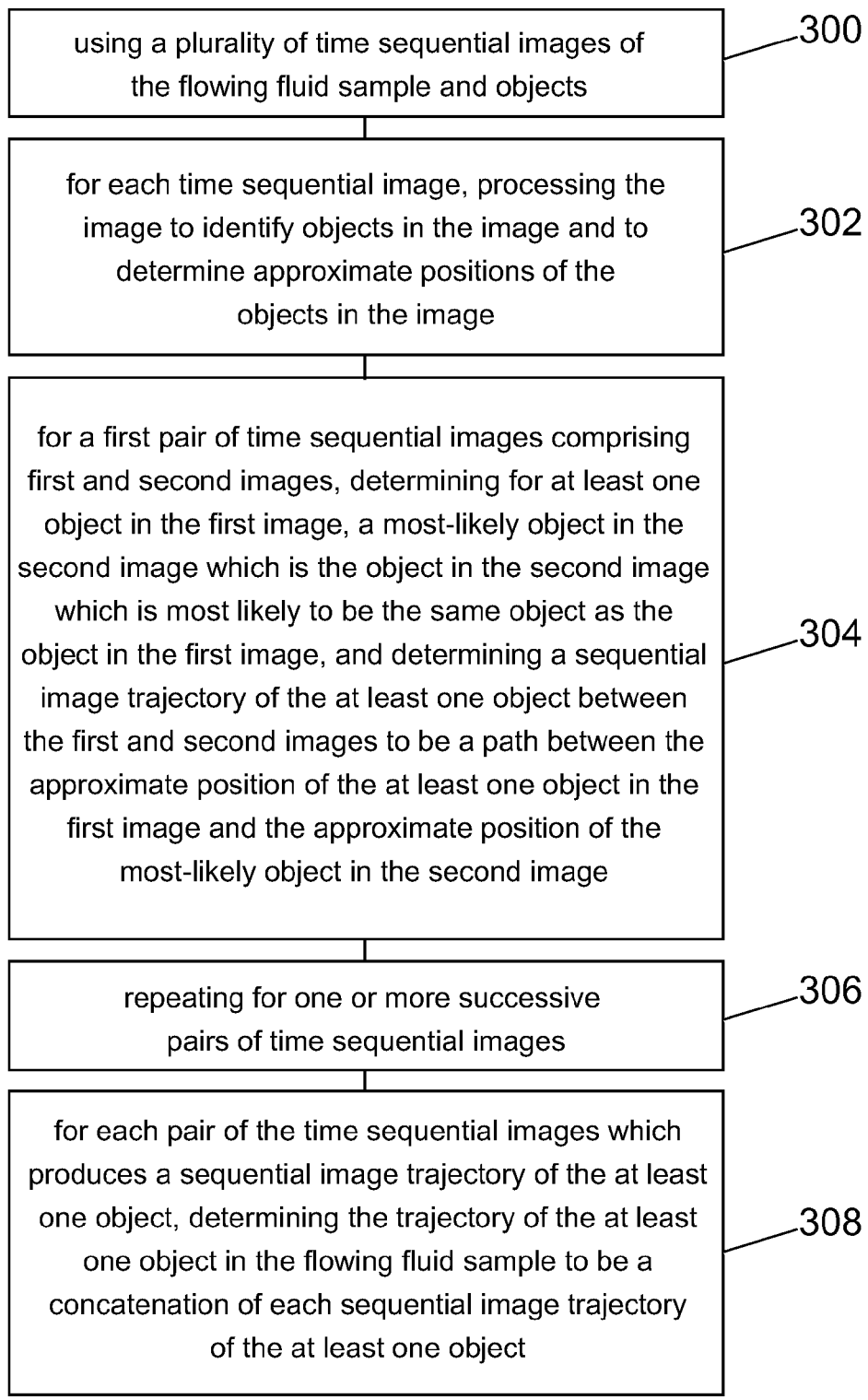
FIG. 16 is a flow chart illustrating the method of the sixth aspect of the invention.

Referring to FIG. 16, the method of determining a trajectory of an object in a flowing fluid sample comprising a plurality of objects comprises the steps of (a) acquiring a plurality of time sequential images of the flowing fluid sample and objects (step 300), (b) for each time sequential image, processing the image to identify objects in the image and to determine approximate positions of the objects in the image (step 302), (c) for a first pair of time sequential images comprising first and second images (step 304), (i) determining for at least one object in the first image, a most-likely object in the second image which is the object in the second image which is most likely to be the same object as the object in the first image, (ii) determining a sequential image trajectory of the at least one object between the first and second images to be a path between the approximate position of the at least one object in the first image and the approximate position of the most-likely object in the second image, (d) repeating step (c) for one or more successive pairs of time sequential images (step 306), and (e) for each pair of the time sequential images which produces a sequential image trajectory of the at least one object, determining the trajectory of the at least one object in the flowing fluid sample to be a concatenation of each sequential image trajectory of the at least one object (step 308).

The images of the flowing fluid sample and objects are produced using the device of the first aspect of the invention in a system of the second aspect of the invention. The plurality of time sequential images are acquired using a liquid chilled Quantix-57 CCD camera (Photometrics Ltd, AZ, USA) to capture the images. The CCD camera takes 24 frames per second, has a viewing region of 267×256 pixels (52.5×54.9 μm) and an exposure time of 40 ms. The plurality of time sequential images are acquired over a time lapse of up to 120 s. At least some of the objects in the sample fluid are fluorescently labelled, and a radiation source of a Zeiss Axiovert-200 epi-fluorescence microscope with 63× Plan-Apochromat objective is used to excite the fluorescently-labelled objects to produce fluorescent images, which are acquired by the CCD camera.

The computer program of the eighth aspect of the invention carries out the method step of processing each image to identify objects within the image. The computer program of the invention uses a customised computer program from LabView-Vision, National Instruments, TX, USA, specifically the img2list.vi Labview program. This program works by utilizing the Vision software within Labview, and has been designed to process all of the images in a single folder. The program generates a list of images from the selected folder, and each image is processed separately and has its own saved output.

The computer program of the invention processes an image by determining a threshold value to aid separation of objects in the image from background in the image, and processing the image using the threshold value. The computer program of the invention uses the IMAQ AutoBThreshold program to statistically determine a threshold value (object versus background), and thus avoids threshold guesswork by a user. The image is then processed to identify objects further comprises locating objects in the image which are in contact with an edge of the image, and discarding such objects from further analysis.

In this embodiment, the image is further processed to define a circular shape criterion for objects in the image, and to identify only objects having a substantially circular shape. The computer program of the invention uses the IMAQ Find Circles .vi program to identify substantially circular objects. Processing the image then comprises defining a size criterion for objects in the image comprising a minimum size and a maximum size, and only identifying objects having a size which falls between the minimum size and the maximum size. The image is further processed to detect objects in the image which are overlapping or touching using the shape criterion and the size criterion, separate the objects, and identify the separated objects as objects in the image.

For each processed image, the computer program of the invention determines approximate positions of objects in the image, in units of pixels of the image, by generating (x, y) coordinates of the approximate positions of centroids of the objects, using the shape criterion and the IMAQ Find Circles .vi program. The computer program of the invention also determines an approximate size of objects in the image, in units of pixels of the image, using the shape criterion and the IMAQ Find Circles .vi program. image. For each processed image, the computer program of the invention then generates an object array comprising a list of each object, (x, y) coordinates of the approximate position of the centroid of each object and an approximate size of each object. The object array for each image is in the form of a .txt file, i.e. a stack of images is converted into a set of .txt files listing the objects identified in each image.

The computer program of the invention may then take a list of .txt files for the images and combine them into a single .txt file having a desired name. This may be carried out using the combinetxt.vi LabView program. Alternatively, this function may be provided by a separate program from that of the invention, because the user might wish to combine pieces of an experiment where images are acquired rather than all the images before analysis for any number of reasons.

Using the object arrays of the first pair of time sequential images (comprising first and second images), the computer program of the invention then carries out the method step of simultaneously determining for all objects identified in the first image, a most-likely object in the second image, using a trackplateletsyx.m Matlab program. This comprises pairing each object in the first image with each of the objects in the second image, and calculating a probability value for each pair of objects using their approximate positions in the first and second images. A probability array is generated which comprises a list of each object pair and a calculated probability value for each object pair.

A pair of objects which has a highest probability value is then identified. If the highest probability value is greater than or equal to a threshold probability value, it is determined that the second object of the pair of objects is the most-likely object in the second image for the first object of the pair of objects. A sequential image trajectory of the first object of the pair of objects, between the first and second images, is then determined to be a path between the approximate position in the first image of the first object of the pair of objects and the approximate position in the second image of the second object of the pair of objects.

Each other pair of objects which comprise one of the objects of the highest probability pair are then discarded from further analysis. A further highest probability pair of objects is then determined, using the reduced set of remaining pairs of objects. If the probability value of this pair of objects is greater than or equal to a threshold probability value, it is determined that the second object of this pair of objects is the most-likely object in the second image for the first object of this pair of objects. A sequential image trajectory of the first object of this pair of objects, between the first and second images, is then determined to be a path between the approximate position in the first image of the first object of this pair of objects and the approximate position in the second image of the second object of this pair of objects. This is repeated until the probability values for each remaining pair of objects is less than a threshold probability value, If the highest probability value is not greater than or equal to a threshold probability value, the method may comprise determining that no most-likely object in the second image exists, and no sequential image trajectory of the object between the pair of images is determined.

Calculating a probability value for each pair of objects using their approximate positions in the first and second images, comprises calculating a probability value between 0 and 1, using a position-based probability function. The probability function has parameters which are chosen to prefer downstream movement over cross-stream movement or upstream movement of an object, and comprises a cut-off distance which is used to negate any upstream movement of an object. The probability function is defined by $$p(\Delta x, \Delta y, t) = a\left(\exp\left[-\frac{(\Delta y - u\Delta t)^2}{\sigma_y^2}\right] \times \exp\left[-\frac{\Delta x^2}{\sigma_x^2 |\Delta y|}\right]\right) +$$
$$b\left(\exp\left[-\frac{(\Delta y - c)^2 + (\Delta x/d)^2}{\sigma_r^2}\right]\right)$$

when $\Delta y - u\Delta t > -y_c$ and $$= 0$$

when $\Delta y - u\Delta t \leq -y_c$ where ρ is the probability value, y is a coordinate axis in the flow direction of the fluid sample, x is a coordinate axis in the direction perpendicular to the flow direction of the fluid sample, Δt is the period of time between subsequent images, Δx is the distance moved in the x axis between images, Δy is the distance moved in the y axis between images, $\sigma_y$ is the variance in movement in the y axis, $\sigma_x$ is the variance in movement in the x axis, $\sigma_r$ is the variance radially, u is the expected object velocity, $y_c$ is a cut-off parameter that artificially sets the probability function to zero, and a, b, c, and d are shaping parameters with a+b=1.

| In this embodiment, the values of $\sigma_y$, $\sigma_x$, $\sigma_r$, u, a, b, c, d and $y_c$ are | | |
|---|---|---|
| Parameter | Value | Units |
| $\sigma_y$ | 45 | square pixels |
| $\sigma_x$ | 2 | square pixels |
| $\sigma_r$ | 1.5 | square pixels |
| u | 4 | pixels |
| a | 0.5 | |
| b | 0.5 | |
| c | 1 | |
| d | 2 | |
| $y_c$ | 2 | pixels |

The probability function comprises a positional uncertainty term which accounts for inherent noise associated with determining the approximate positions of objects in an image. The term defines an uncertainty range of positions for an object, comprising two pixels to the left and two pixels to the right of a chosen position, and considers any objects whose positions fall within the range to have a high probability of being the same object.

Using the object arrays of the next pair of time sequential images, the computer program of the invention then repeats the method step of simultaneously determining for all objects identified in the first image of the pair of images, a most-likely object in the second image of the pair of images. The method is then repeated for each successive pair of the time sequential images. Thus movement of the object between the successive images may be tracked. For each object, and for each successive pair of the time sequential images which produces a sequential image trajectory of the object, a trajectory of the object in the flowing fluid sample is determined to be a concatenation of each sequential image trajectory of the object. An object trajectory in time and space is therefore produced.

A trajectory positional array is then generated which comprises a list of the objects and trajectory positional information for each object, in the form of a list of approximate positions of each object in one or more images. A trajectory velocity array is also generated which comprises a list of the objects and trajectory velocity information for each object, in the form of a list of velocity measurements of each object between one or more images. The velocity measurements of an object may comprise zero velocity measurements for one or more periods where the object is stationary and non-zero velocity measurements for one or more periods where the object is moving. Thus data concerning periods where an object is moving, and data concerning periods where the object is stationary may be provided. The trajectory velocity information may further comprise a measure of mean velocity over one or more images for one or more of the trajectories. The trajectory velocity information may further comprise a measure of a fit to approximate non-zero velocity measurements of one or more trajectories. Changes in velocity characteristics of the trajectories may be detected that are not clearly reflected in a mean velocity measure. Each velocity measurement for an object is generated using fluctuation of the position of the centroid of the object over five images, using a localveltraj.m Matlab program. These velocity measurements are capable distinguishing between a slow-moving object and a non-moving object. This is possible as velocity measurements over a plurality of images for an object which is slow-moving will show downstream movement, whilst velocity measurements over a plurality of images for a non-moving object will show oscillation about a fixed object position.

The method described above may be used to determine a trajectory of an object comprising a cell in a flowing fluid sample. The cell trajectory may be used to determine interactions of the cell within the fluid sample. The fluid sample may be flowing past a test surface and the cell trajectory may be used to determine interactions of the cell with the test surface. The method may also be used to determine a trajectory of an object comprising a blood platelet in a flowing fluid sample. The platelet trajectory may be used to determine interactions of the platelet within the fluid sample. The fluid sample may be flowing past a test surface and the platelet trajectory may be used to determine interactions of the platelet with the test surface, such as a VWF test surface.

The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area. When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

Figure 17:
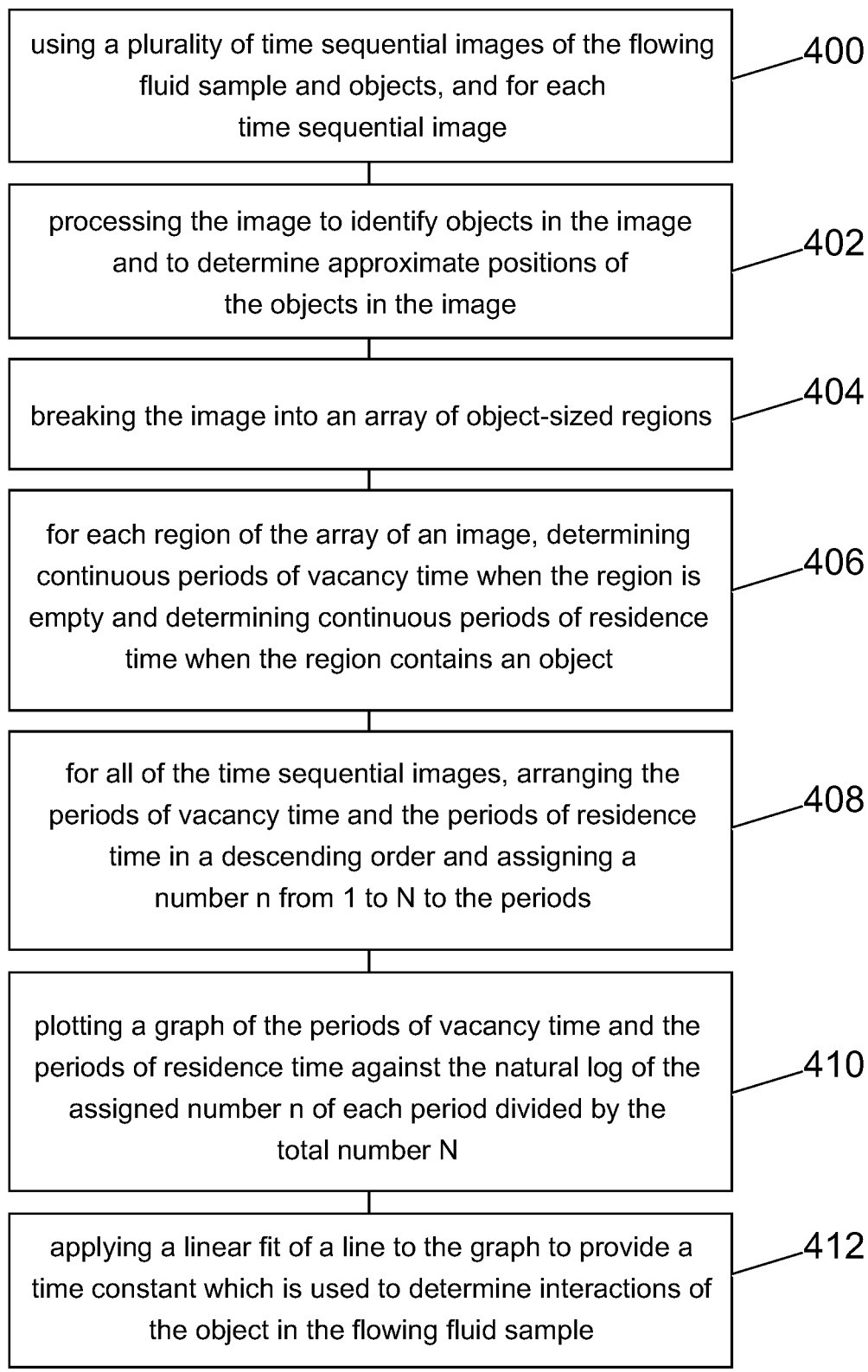
FIG. 17 is a flow chart illustrating the method of the eighth aspect of the invention.

Referring to FIG. 17, the method of determining interactions of an object in a flowing fluid sample comprising a plurality of objects comprises the steps of (a) using a plurality of time sequential images of the flowing fluid sample and objects, and for each time sequential image (step 400), (b) processing the image to identify objects in the image and to determine approximate positions of the objects in the image (step 402), (c) breaking the image into an array of object-sized regions (step 404), (d) for each region of the array of an image, determining continuous periods of vacancy time when the region is empty and determining continuous periods of residence time when the region contains an object (step 406), (e) for all of the time sequential images, arranging the periods of vacancy time and the periods of residence time in a descending order and assigning a number n from 1 to N to the periods (step 408), (f) plotting a graph of the periods of vacancy time and the periods of residence time against the natural log of the assigned number n of each period divided by the total number N (step 410), and (g) applying a linear fit of a line to the graph to provide a time constant which is used to determine interactions of the object in the flowing fluid sample (step 412).

The images of the flowing fluid sample and objects are produced using the device of the first aspect of the invention in a system of the second aspect of the invention. The plurality of time sequential images are acquired using a liquid chilled Quantix-57 CCD camera (Photometrics Ltd, AZ, USA) to capture the images. The CCD camera takes 24 frames per second, has a viewing region of 267×256 pixels (52.5×54.9 µm) and an exposure time of 40 ms. The plurality of time sequential images are acquired over a time lapse of up to 120 s. At least some of the objects in the sample fluid are fluorescently labelled, and a radiation source of a Zeiss Axiovert-200 epi-fluorescence microscope with 63× Plan-Apochromat objective is used to excite the fluorescently-labelled objects to produce fluorescent images, which are acquired by the CCD camera.

The computer program of the tenth aspect of the invention carries out the steps of the above method, and comprises a boxesns.m Matlab program. For each image, objects which would result in large numbers of false short residency/vacancy periods are removed from further analysis of the image. The image is broken up into an array of small regions that will typically contain either 0 or 1 object. Each of these regions is determined to be filled or empty for each image, based on the position of the object's centroid. Looking over the set of times at which the images were acquired, the data consists of periods over which the regions are either vacant (filled to vacant to filled) or filled (vacant to filled to vacant). These periods are arranged in descending order and are numbered n from 1 to N. If the data is a Poisson distribution, plotting these periods vs ln(n/N) will result in a straight line which can be subjected to a linear fit to extract a line and a time constant therefrom. This time constant will be heavily influenced by the binding constants involved in the interaction between the objects, e.g. between the objects and a surface across which the fluid sample flows. As such, changes in the shape and/or slope of this line has diagnostic potential.

The method may be used to determine interactions of an object comprising a cell in a flowing fluid sample. The fluid sample may be flowing past a test surface and the method may be used to determine interactions of the cell with the test surface.

The method may be used to determine interactions of an object comprising a blood platelet in a flowing fluid sample. The fluid sample may be flowing past a test surface and the method may be used to determine interactions of the platelet with the test surface. The test surface may comprise VWF and the method may be used to determine platelet-VWF interactions.

The test material may be an activating, agonistic, or other biologically relevant material. The test material may be attached to the test area by dip coating procedures, or micropatterning. Micropatterning, either by microcontact printing or microfluidic networks, can yield an array of test materials on the test area of micrometer dimensions. The test material may comprise, for example, one or more protein matrices. For example different protein matrices may be immobilised or linear arrays of vascular matrix proteins (such as collagen, VWF, or fibronectin) of a defined diameter and length may be patterned on the test area for simultaneous measurement of cellular interactions on these matrix proteins, under an applied shear force. This allows simultaneous interrogation of the fluid sample in contact with several test materials. The matrices may have a substantially uniform thickness across the test area. When the objects are platelets, the test material can be:—annexin V, antiobjects specific for P-selectin, CD63, LAMP-1, LAMP-2, Na, fXa, vWF, 5-HT, thrombospondin, fibronectin, à2-antiplasmin, fibrinogen, antiobjects recognising an activated conformation of platelet receptors (such as PAC-1 or LIBS-binding antiobjects, or any fragment thereof capable of binding to an activated platelet, or any combination thereof.

The invention claimed is:

1. A platelet/protein matrix interaction microfluidic device comprising:
    a sample inlet adapted to receive a fluid sample comprising a plurality of platelets;
    a buffer inlet adapted to receive a fluid buffer;
    an outlet adapted to output the fluid sample from the device;
    at least one internal surface defining a flow cavity within the device;
    wherein the flow cavity extends between the sample inlet and the outlet for flow of the fluid sample through the flow cavity;
    wherein the flow cavity comprises a first portion and a second portion, the first portion being connected to the sample inlet and comprising, on an internal surface of the first portion, a test area to which at least one protein matrix capable of interacting with the plurality of platelets is attached and which is situated in the flow cavity for flow of the fluid sample into the first portion and over the test area, the second portion being connected to the buffer inlet for flow of the fluid buffer into the second portion and surrounding the fluid sample in the first portion on three sides, which sides do not comprise a side of the fluid sample flowing over the test area, in order to shape the flow of the fluid sample and to direct the flow to contact the test area of the flow cavity such that the plurality of platelets interact with the protein matrix; and
    wherein the flow cavity has an aspect ratio which, when the flow cavity is substantially filled by the fluid sample and the fluid buffer, provides a substantially constant shear force between the test area and the fluid sample flowing over the test area.

2. The platelet/protein matrix interaction microfluidic device according to claim 1, wherein the aspect ratio of the flow cavity is in a range of approximately 15 to approximately 2000.

3. A platelet/protein matrix interaction system comprising:
    a microfluidic device according to claim 1; and
    a detection apparatus which is arranged to detect interactions of platelets of a fluid sample in the microfluidic device with a protein matrix of the test area of the microfluidic device.

4. A platelet/protein matrix interaction system comprising:
    a microfluidic device according to claim 1; and
    an epi-fluorescent microscope.

5. The platelet/protein matrix interaction microfluidic device according to claim 2, wherein the aspect ratio of the flow cavity is in the range of approximately 400 to approximately 800.

* * * * *